(12) United States Patent
Huang et al.

(10) Patent No.: US 11,342,972 B2
(45) Date of Patent: May 24, 2022

(54) UPLINK TRANSMISSION METHOD, UPLINK TRANSMISSION SCHEDULING METHOD, AND DEVICE

(71) Applicant: DATANG MOBILE COMMUNICATIONS EQUIPMENT CO., LTD., Beijing (CN)

(72) Inventors: Qiuping Huang, Beijing (CN); Qiubin Gao, Beijing (CN); Runhua Chen, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 0 days.

(21) Appl. No.: 17/281,190

(22) PCT Filed: Sep. 12, 2019

(86) PCT No.: PCT/CN2019/105613
§ 371 (c)(1),
(2) Date: Mar. 29, 2021

(87) PCT Pub. No.: WO2020/063365
PCT Pub. Date: Apr. 2, 2020

(65) Prior Publication Data
US 2021/0399773 A1 Dec. 23, 2021

(30) Foreign Application Priority Data
Sep. 28, 2018 (CN) .......................... 201811142744.1

(51) Int. Cl.
*H04B 7/02* (2018.01)
*H04B 7/0456* (2017.01)
(Continued)

(52) U.S. Cl.
CPC ......... *H04B 7/0456* (2013.01); *H04B 7/0621* (2013.01); *H04B 17/364* (2015.01); *H04W 72/1268* (2013.01)

(58) Field of Classification Search
CPC .. H04B 7/0456; H04B 7/0621; H04B 17/364; H04W 72/1268
(Continued)

(56) References Cited

U.S. PATENT DOCUMENTS 8,107,455 B2  1/2012 Ko et al.
9,912,430 B2  3/2018 Sayana et al.
(Continued)

FOREIGN PATENT DOCUMENTS

CN  101461205 A  6/2009
CN  102017443 A  4/2011
(Continued)

OTHER PUBLICATIONS

First Office Action and Search Report from CN app. No. .201811142744.1, dated Aug. 31, 2020, with English translation provided by Global Dossier, all pages.
(Continued)

*Primary Examiner* — Helene E Tayong
(74) *Attorney, Agent, or Firm* — Ladas & Parry, LLP

(57) ABSTRACT

Embodiments of the present disclosure disclose an uplink transmission method, an uplink transmission scheduling method and a device. The uplink transmission method is applied to a terminal and includes: performing delay processing of an uplink signal on multiple antenna ports and then transmitting the uplink signal.

20 Claims, 4 Drawing Sheets

(51) Int. Cl.
  *H04B 17/364* (2015.01)
  *H04W 72/12* (2009.01)
  *H04B 7/06* (2006.01)

(58) Field of Classification Search
  USPC .................................................. 375/267
  See application file for complete search history.

(56) References Cited

U.S. PATENT DOCUMENTS

| | | |
|---|---|---|
| 2007/0274411 A1 | 11/2007 | Lee et al. |
| 2008/0287075 A1 | 11/2008 | Kim et al. |
| 2009/0279632 A1* | 11/2009 | Lee .................. H04B 7/0671 375/267 |
| 2010/0322349 A1* | 12/2010 | Lee .................. H04B 7/0671 375/299 |
| 2011/0158219 A1 | 6/2011 | Ko et al. |
| 2012/0257575 A1 | 10/2012 | Davydov et al. |
| 2013/0058424 A1* | 3/2013 | Enescu ............ H04L 25/03936 375/267 |
| 2014/0328242 A1 | 11/2014 | Tong et al. |
| 2017/0085308 A1 | 3/2017 | Sun et al. |
| 2019/0028162 A1* | 1/2019 | Lee .................. H04B 7/0486 |

FOREIGN PATENT DOCUMENTS

| | | |
|---|---|---|
| CN | 102957467 A | 3/2013 |
| CN | 103460618 A | 12/2013 |
| CN | 106105075 A | 11/2016 |
| CN | 106470064 A | 3/2017 |
| TW | 200910802 A | 3/2009 |
| WO | 2012048072 A1 | 4/2012 |
| WO | 2018127781 A1 | 7/2018 |
| WO | 2018132781 A1 | 7/2018 |

OTHER PUBLICATIONS

First Office Action from TW app. No. 108135119, dated Jul. 6, 2021, with machine English translation, all pages.
International Search Report from PCT/CN2019/105613, dated Nov. 27, 2019, with English translation from WIPO, all pages.
Written Opinion of the International Searching Authority from PCT/CN2019/105613, dated Nov. 27, 2019, with English translation from WIPO, all pages.
International Preliminary Report on Patentability from PCT/CN2019/105613, dated Mar. 23, 2021, with English translation from WIPO, all pages.
Extended European Search Report and opinion from corresponding EP app. No. 19866306.4, dated Oct. 20, 2021, all pages.
Office Action from IN app. No. 202127017317, dated Feb. 8, 2022, all pages.

* cited by examiner

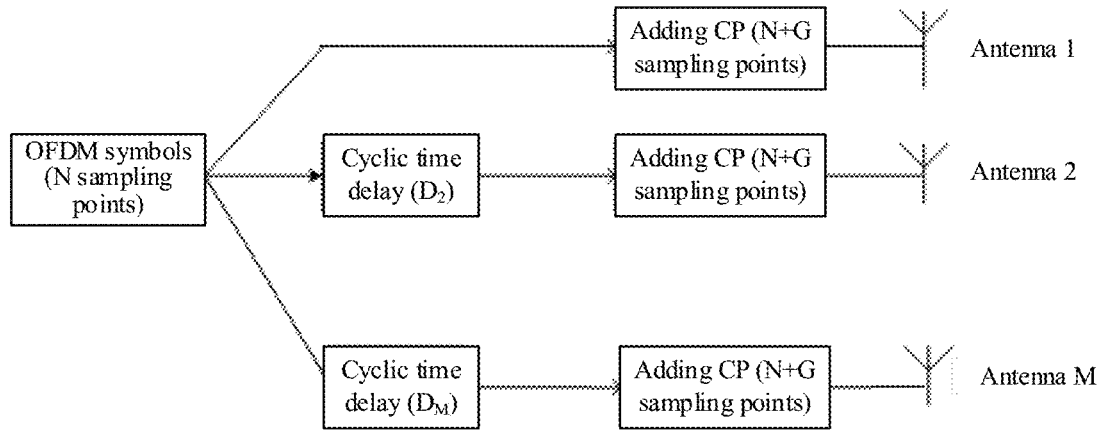

FIG. 3

| Performing delay processing of an uplink signal on multiple antenna ports and then transmitting the uplink signal | 41 |

FIG. 4

| Performing precoding processing of an uplink signal on multiple antenna ports by cyclically using codewords in a first candidate codeword set, and then transmitting the uplink signal | 51 |

FIG. 5

| Determining scheduling information of an uplink signal according to a transmission scheme of a terminal for the uplink signal | 61 |

FIG. 6

UPLINK TRANSMISSION METHOD, UPLINK TRANSMISSION SCHEDULING METHOD, AND DEVICE

CROSS-REFERENCE TO RELATED APPLICATIONS

This application is a U.S. national phase application of a PCT Application No. PCT/CN2019/105613 filed on Sep. 12, 2019, which claims a priority to Chinese Patent Application No. 201811142744.1, filed in China on Sep. 28, 2018, the disclosures of which are incorporated in their entireties by reference herein.

TECHNICAL FIELD

Embodiments of the present disclosure relate to the field of communication technology, and in particular to an uplink transmission method, an uplink transmission scheduling method and a device.

BACKGROUND

A codebook-based uplink transmission scheme is a multi-antenna transmission technology that determines an uplink transmission precoding matrix based on a fixed codebook. The codebook-based uplink transmission scheme in a fifth-generation New Radio Access Technology (5G NR) system and an uplink spatial multiplexing technology in a Long Term Evolution (LTE) system have similar basic principles, but use different codebooks and precoding indication manners. As shown in FIG. 1, in the NR system, a process of the codebook-based uplink transmission scheme includes:

1) User equipment (UE) sends to a base station an uplink sounding reference signal (SRS) for the channel state information acquisition of the codebook-based uplink transmission scheme;

2) The base station performs uplink channel detection according to the SRS sent by the UE, performs resource scheduling for the UE, and determines an SRS resource corresponding to the uplink transmission, a quantity of uplink transmission layers and precoding matrix, and further determines a modulation and coding scheme (MCS) level of the uplink transmission based on the precoding matrix and channel information, and then the base station notifies the UE of the physical uplink shared channel (PUSCH) resource allocation and corresponding MCS, transmit precoding matrix indicator (TPMI), quantity of transmission layers, and corresponding SRS resource indicator (SRI);

3) The UE modulates and encodes data according to the MCS indicated by the base station, and determines the precoding matrix and the quantity of transmission layers used in data transmission by using the indicated SRI, TPMI, and quantity of transmission layers, and then precodes and transmits the data; wherein a same precoding manner is used for the PUSCH demodulation pilot and the PUSCH data;

4) The base station estimates the uplink channel based on the demodulation pilot signal and performs data detection.

In a 3GPP NR system, the codebook-based uplink transmission scheme uses the following precoding manner (section 6.3.1.5, 3GPP standard documentation TS38.211-f20 (2018-06)):

$x(i)=[x^{(0)}(i) \ldots x^{(\upsilon-1)}(i)]^T$, $i=0, 1, \ldots, M_{symb}^{layer}-1$ is used to represent a signal symbol obtained after layer mapping of PUSCH, $x^{(j)}(i)$ represents the i-th symbol of the j-th data stream (also called data layer/layer); $\upsilon$ represents the quantity of transmission streams (the quantity of data streams); $y(i)=[\ldots y^{(p)}(i) \ldots ]^T$, $i=0, 1, \ldots, M_{symb}^{ap}-1$ represents the symbol mapped to each antenna port and corresponding to x(i), p represents an index of antenna port, and $y^{(p)}(i)$ represents the symbol mapped to the antenna port i and corresponding to x(i);

the data stream is precoded in the following manner:

$$\begin{bmatrix} y^{(0)}(i) \\ M \\ y^{(P-1)}(i) \end{bmatrix} = W(i) \begin{bmatrix} x^{(0)}(i) \\ M \\ x^{(\upsilon-1)}(i) \end{bmatrix}$$

where the dimension of the precoding matrix W(i) is P×υ, $i=0, 1, \ldots, M_{symb}^{ap}-1$, $M_{symb}^{ap}=M_{symb}^{layer}$, P represents the quantity of antenna ports configured for the UE that correspond to the uplink signal.

For multiple input multiple output (MIMO) transmission of UE, the characteristics of the transmission antenna and radio frequency of UE are quite different from those of the base station, and the codebook design needs to fully consider the coherence characteristics between the antennas. When two antenna ports meet the coherence condition, that is, when the transmit paths of each antenna unit can be adjusted to the same power and the same phase, the UE can use the two antenna ports simultaneously to perform data transmission of the same layer through precoding, to obtain array gain. However, due to the influence of factors such as mutual coupling effects of antenna array elements, feeder differences, and changes in the phase and gain of the amplifier in the radio frequency path, there are inevitably differences in power and phase between the actual UE antenna ports. Subject to the limitation of cost and design, not all UE can calibrate each antenna port so that the requirements of coherent transmission are met. For the UE incapable of antenna coherent transmission, there may be a large difference between the phase difference between the UE antennas when the base station calculates TPMI and the phase difference between the antennas when the UE performs PUSCH transmission after receiving the TPMI. If the TPMI indicates that antennas incapable of coherent transmission are used for the transmission of a same data layer, an optimal uplink transmission precoding of the terminal may not be the precoding indicated by the TPMI, that is, the terminal cannot yield a good performance while using the precoding indicated by the base station through the TPMI to perform PUSCH transmission.

In the NR system, three types of UE antenna coherent transmission capabilities are defined:

1) Full-coherent: all antennas can carry out coherent transmission;

2) Partial-coherent: antennas in the same coherent transmission group can carry out coherent transmission, and coherent transmission cannot be carried out between coherent transmission groups, wherein each coherent transmission group contains 2 antennas;

3) Non-coherent: no antenna can carry out coherent transmission.

The uplink codebook of the NR system contains codewords for partial-coherent transmission and non-coherent transmission, to be used for UE with partial-coherent transmission capability or non-coherent transmission capability. In any column of the codeword for the partial-coherent transmission, only elements corresponding to antennas of the same coherent transmission antenna group are non-zero elements, and only the elements of this coherent transmission antenna group are non-zero, that is, there are only two non-zero elements corresponding to the same coherent transmission antenna group in each column in the codeword, and all other elements are zero (in the 3GPP NR system, the first and third antennas form one coherent transmission antenna group, and the second and fourth antennas form the other coherent transmission antenna group); any column in the non-coherent transmission codeword has only a non-zero element corresponding to one antenna, that is, there is only one non-zero element in each column of the codeword, and other elements are zero. In the codeword of the full-coherent transmission, there is at least one column in which all elements are non-zero. For ease of understanding, Table 1 and Table 2 show the codebooks for 4-antenna single-stream and dual-stream transmissions with orthogonal frequency division multiplexing (OFDM) waveform of the NR system respectively.

TABLE 1

Uplink single-stream transmission codebook (4-antenna) when CP-OFDM waveform is used

| Quantity of codewords | Codeword | Codeword characteristics |
|---|---|---|
| 16 | $\frac{1}{2}\begin{bmatrix}1\\1\\1\\1\end{bmatrix}$, $\frac{1}{2}\begin{bmatrix}1\\1\\j\\j\end{bmatrix}$, $\frac{1}{2}\begin{bmatrix}1\\1\\-1\\-1\end{bmatrix}$, $\frac{1}{2}\begin{bmatrix}1\\1\\-j\\-j\end{bmatrix}$, $\frac{1}{2}\begin{bmatrix}1\\j\\1\\j\end{bmatrix}$, $\frac{1}{2}\begin{bmatrix}1\\j\\j\\-1\end{bmatrix}$, $\frac{1}{2}\begin{bmatrix}1\\j\\-1\\-j\end{bmatrix}$, $\frac{1}{2}\begin{bmatrix}1\\j\\-j\\1\end{bmatrix}$, $\frac{1}{2}\begin{bmatrix}1\\-1\\1\\-1\end{bmatrix}$, $\frac{1}{2}\begin{bmatrix}1\\-1\\j\\-j\end{bmatrix}$, $\frac{1}{2}\begin{bmatrix}1\\-1\\-1\\1\end{bmatrix}$, $\frac{1}{2}\begin{bmatrix}1\\-1\\-j\\j\end{bmatrix}$, $\frac{1}{2}\begin{bmatrix}1\\-j\\1\\-j\end{bmatrix}$, $\frac{1}{2}\begin{bmatrix}1\\-j\\j\\1\end{bmatrix}$, $\frac{1}{2}\begin{bmatrix}1\\-j\\-1\\j\end{bmatrix}$, $\frac{1}{2}\begin{bmatrix}1\\-j\\-j\\-1\end{bmatrix}$ | Full-coherent transmission |
| 8 | $\frac{1}{2}\begin{bmatrix}1\\0\\1\\0\end{bmatrix}$, $\frac{1}{2}\begin{bmatrix}1\\0\\-1\\0\end{bmatrix}$, $\frac{1}{2}\begin{bmatrix}1\\0\\j\\0\end{bmatrix}$, $\frac{1}{2}\begin{bmatrix}1\\0\\-j\\0\end{bmatrix}$, $\frac{1}{2}\begin{bmatrix}0\\1\\0\\1\end{bmatrix}$, $\frac{1}{2}\begin{bmatrix}0\\1\\0\\-1\end{bmatrix}$, $\frac{1}{2}\begin{bmatrix}0\\1\\0\\j\end{bmatrix}$, $\frac{1}{2}\begin{bmatrix}0\\1\\0\\-j\end{bmatrix}$ | Partial-coherent transmission |
| 4 | $\frac{1}{2}\begin{bmatrix}1\\0\\0\\0\end{bmatrix}$, $\frac{1}{2}\begin{bmatrix}0\\1\\0\\0\end{bmatrix}$, $\frac{1}{2}\begin{bmatrix}0\\0\\1\\0\end{bmatrix}$, $\frac{1}{2}\begin{bmatrix}0\\0\\0\\1\end{bmatrix}$ | Non-coherent transmission |

TABLE 2

Uplink dual-stream transmission codebook (4-antenna) when CP-OFDM waveform is used

| Quantity of codewords | Codeword | Codeword characteristics |
|---|---|---|
| 8 | $\frac{1}{2\sqrt{2}}\begin{bmatrix}1&1\\1&1\\1&-1\\1&-1\end{bmatrix}$, $\frac{1}{2\sqrt{2}}\begin{bmatrix}1&1\\1&1\\j&-j\\j&-j\end{bmatrix}$, $\frac{1}{2\sqrt{2}}\begin{bmatrix}1&1\\j&j\\1&-1\\j&-j\end{bmatrix}$, $\frac{1}{2\sqrt{2}}\begin{bmatrix}1&1\\j&j\\j&-j\\-1&1\end{bmatrix}$, $\frac{1}{2\sqrt{2}}\begin{bmatrix}1&1\\-1&-1\\1&-1\\-1&1\end{bmatrix}$, $\frac{1}{2\sqrt{2}}\begin{bmatrix}1&1\\-1&-1\\j&-j\\-j&j\end{bmatrix}$, $\frac{1}{2\sqrt{2}}\begin{bmatrix}1&1\\-j&-j\\1&-1\\-j&j\end{bmatrix}$, $\frac{1}{2\sqrt{2}}\begin{bmatrix}1&1\\-j&-j\\j&-j\\1&-1\end{bmatrix}$ | Full-coherent transmission |
| 8 | $\frac{1}{2}\begin{bmatrix}1&0\\0&1\\1&0\\0&-j\end{bmatrix}$, $\frac{1}{2}\begin{bmatrix}1&0\\0&1\\1&0\\0&j\end{bmatrix}$, $\frac{1}{2}\begin{bmatrix}1&0\\0&1\\-j&0\\0&1\end{bmatrix}$, $\frac{1}{2}\begin{bmatrix}1&0\\0&1\\-j&0\\0&-1\end{bmatrix}$, $\frac{1}{2}\begin{bmatrix}1&0\\0&1\\-1&0\\0&-j\end{bmatrix}$, $\frac{1}{2}\begin{bmatrix}1&0\\0&1\\-1&0\\0&j\end{bmatrix}$, $\frac{1}{2}\begin{bmatrix}1&0\\0&1\\j&0\\0&1\end{bmatrix}$, $\frac{1}{2}\begin{bmatrix}1&0\\0&1\\j&0\\0&-1\end{bmatrix}$ | Partial-coherent transmission |

TABLE 2-continued

Uplink dual-stream transmission codebook (4-antenna) when CP-OFDM waveform is used

| Quantity of codewords | Codeword | | | | Codeword characteristics |
|---|---|---|---|---|---|
| 6 | $\frac{1}{2}\begin{bmatrix} 1 & 0 \\ 0 & 1 \\ 0 & 0 \\ 0 & 0 \end{bmatrix}$ | $\frac{1}{2}\begin{bmatrix} 1 & 0 \\ 0 & 0 \\ 0 & 1 \\ 0 & 0 \end{bmatrix}$ | $\frac{1}{2}\begin{bmatrix} 1 & 0 \\ 0 & 0 \\ 0 & 0 \\ 0 & 1 \end{bmatrix}$ | $\frac{1}{2}\begin{bmatrix} 0 & 0 \\ 1 & 0 \\ 0 & 1 \\ 0 & 0 \end{bmatrix}$ | Non-coherent transmission |
| | $\frac{1}{2}\begin{bmatrix} 0 & 0 \\ 1 & 0 \\ 0 & 0 \\ 0 & 1 \end{bmatrix}$ | $\frac{1}{2}\begin{bmatrix} 0 & 0 \\ 0 & 0 \\ 1 & 0 \\ 0 & 1 \end{bmatrix}$ | | | |

In LTE and NR systems, the multi-antenna power allocation method for PUSCH using uplink MIMO is: the UE performs power scaling, according to the proportion of the actual quantity of ports for transmitting signals in the total quantity of ports configured by the base station for the transmission mode corresponding to the PUSCH, of the transmit power (in the NR system, this corresponds to $P_{PUSCH,b,f,c}(i,j,q_d,l)$ in section 7.1.1 in TS 38.213-f20) calculated as per an uplink power control formula, and then divides the scaled power evenly among the antenna ports that actually transmit signals. For example, it is supposed that 4 antenna ports are configured for uplink transmission, and the precoding matrix indicated by the base station is $$\frac{1}{2}\begin{bmatrix} 1 \\ 0 \\ 1 \\ 0 \end{bmatrix},$$

and the transmission power calculated by the UE as per the PUSCH power control formula is P, then the actual transmission power of PUSCH is P/2, where the transmission power of the first antenna port and the transmission power of the third antenna port are each P/4. This scaling does not require that each antenna port of the UE can reach the maximum transmission power, thereby allowing the UE to use lower-cost radio frequency components to realize a multiple-antenna function.

From the perspective of UE performance, when the UE is located at the edge of a cell or the channel conditions are poor, the base station usually configures a low-rank transmission for the UE and the UE transmits data with the maximum transmission power as much as possible. Under the codebook design of the NR system, for the codebook-based uplink transmission, UE with partial-coherent transmission capability or non-coherent transmission capability always have some antenna ports without PUSCH transmission during single-rank transmission. Therefore, the conventional uplink MIMO multi-antenna power allocation mechanism cannot guarantee that UE with partial-coherent transmission capability or non-coherent transmission capability can reach the maximum transmission power during single-rank transmission under a codebook-based uplink transmission scheme, as a result, the performance of the UE at the edge of the cell is reduced and the coverage of the cell is affected.

It can be seen that, for UE with partial-coherent transmission capability and UE with non-coherent transmission capability, when single-stream transmission is performed under the codebook-based uplink transmission scheme, the transmission power of the terminal cannot reach the maximum transmission power, which will reduce the performance of the UE at the edge of the cell and affect the coverage of the cell. In addition, when the channel changes rapidly or the phase difference or power difference between the terminal antennas changes rapidly, because the precoding matrix indicated by the base station cannot reflect the channel adequately, the uplink transmission scheme of the related art may not yield a good uplink transmission performance.

SUMMARY

An objective of embodiments of the present disclosure is to provide an uplink transmission method, an uplink transmission scheduling method and a device, so as to improve the uplink transmission performance when the channel changes rapidly or the phase difference or power difference between terminal antennas changes rapidly by introducing transmission diversity gain.

An embodiment of the present disclosure provides an uplink transmission method. The method is applied to a terminal and includes:

performing delay processing of an uplink signal on multiple antenna ports and then transmitting the uplink signal.

An embodiment of the present disclosure further provides another uplink transmission method. The method is applied to a terminal and includes:

performing precoding processing of an uplink signal on multiple antenna ports by cyclically using codewords in a first candidate codeword set, and then transmitting the uplink signal.

An embodiment of the present disclosure further provides an uplink transmission scheduling method. The method is applied to a base station and includes:

determining scheduling information of an uplink signal according to a transmission scheme of a terminal for the uplink signal;

wherein, the transmission scheme includes: performing delay processing of the uplink signal on multiple antenna ports, or performing precoding processing of the uplink signal on multiple antenna ports by cyclically using codebooks in a candidate codebook set.

An embodiment of the present disclosure provides a terminal including: a transceiver, a memory, a processor, and a computer program stored in the memory and executable by the processor; wherein the processor is configured to read the computer program in the memory to implement following process: performing delay processing of an uplink signal on multiple antenna ports;

the transceiver is configured to transmit the delay-processed uplink signal.

An embodiment of the present disclosure further provides another terminal, including: a transceiver, a memory, a processor, and a computer program stored in the memory and executable by the processor; wherein the processor is configured to read the computer program in the memory to implement following process: performing precoding processing of an uplink signal on multiple antenna ports by cyclically using codewords in a first candidate codeword set;

the transceiver is configured to transmit the precoding-processed uplink signal.

An embodiment of the present disclosure further provides another terminal, including:

an encoding processing unit, configured to perform delay processing of an uplink signal on multiple antenna ports;

a transceiver unit, configured to transmit the delay-processed uplink signal.

An embodiment of the present disclosure further provides another terminal, including:

an encoding processing unit, configured to perform precoding processing of an uplink signal on multiple antenna ports by cyclically using codewords in a first candidate codeword set;

a transceiver unit, configured to transmit the precoding-processed uplink signal.

An embodiment of the present disclosure provides a base station including: a transceiver, a memory, a processor, and a computer program stored in the memory and executable by the processor; wherein the processor is configured to read the computer program in the memory to implement following process: determining scheduling information of an uplink signal according to a transmission scheme of a terminal for the uplink signal;

wherein, the transmission scheme includes: performing delay processing of the uplink signal on multiple antenna ports in a precoding process, or performing precoding processing of the uplink signal on multiple antenna ports by cyclically using codebooks in a candidate codebook set.

An embodiment of the present disclosure further provides another base station, including:

a determining unit, configured to determine scheduling information of an uplink signal according to a transmission scheme of a terminal for the uplink signal;

wherein, the transmission scheme includes: performing delay processing of the uplink signal on multiple antenna ports in a precoding process, or performing precoding processing of the uplink signal on multiple antenna ports by cyclically using codebooks in a candidate codebook set.

An embodiment of the present disclosure further provides a computer readable storage medium including an instruction, wherein the instruction is configured to be executed by a computer to cause the computer to implement the uplink transmission method or the uplink transmission scheduling method as described above.

According to the uplink transmission method, uplink transmission scheduling method and device provided by the embodiments of the present disclosure, by combining cyclic precoding or CDD with the UE's coherent transmission capability and/or codebook-based/non-codebook-based uplink transmission schemes, transmission diversity gain may be introduced to improve the uplink transmission performance when the channel changes rapidly or the phase difference or power difference between terminal antennas changes rapidly. In addition, the embodiments of the present disclosure may allow the base station to configure full-coherent codewords for UE with partial-coherent transmission capability and a terminal with non-coherent transmission capability, so that the terminal can use full power to perform uplink signal transmission during single-stream transmission. In addition, the embodiments of the present disclosure can adjust the precoding in the frequency domain to avoid the performance degradation problem caused by the mismatch between the precoding and the phase difference of the actual transmitting antennas in the entire frequency band, thereby solving the problem in the NR system that the transmission power of the UE with partial-coherent transmission capability and the terminal with non-coherent transmission capability cannot reach the maximum transmission power during single-stream transmission under the codebook-based uplink transmission scheme.

BRIEF DESCRIPTION OF THE DRAWINGS

To better clarify technical solutions of embodiments of the present disclosure, drawings used in description of the embodiments of the present disclosure are briefly introduced hereinafter. Apparently, the described drawings merely illustrate a part of the disclosed embodiments. A person of ordinary skill in the art can obtain other drawings based on the described drawings without any creative efforts.

FIG. 3 shows a schematic diagram of cyclic delay processing of CDD in the related art;

FIG. 4 is a schematic flowchart of an uplink transmission method provided by an embodiment of the present disclosure;

FIG. 5 is another schematic flowchart of an uplink transmission method provided by an embodiment of the present disclosure;

FIG. 6 is a schematic flowchart of an uplink transmission scheduling method provided by an embodiment of the present disclosure;

DETAILED DESCRIPTION OF THE EMBODIMENTS

Figure 1:
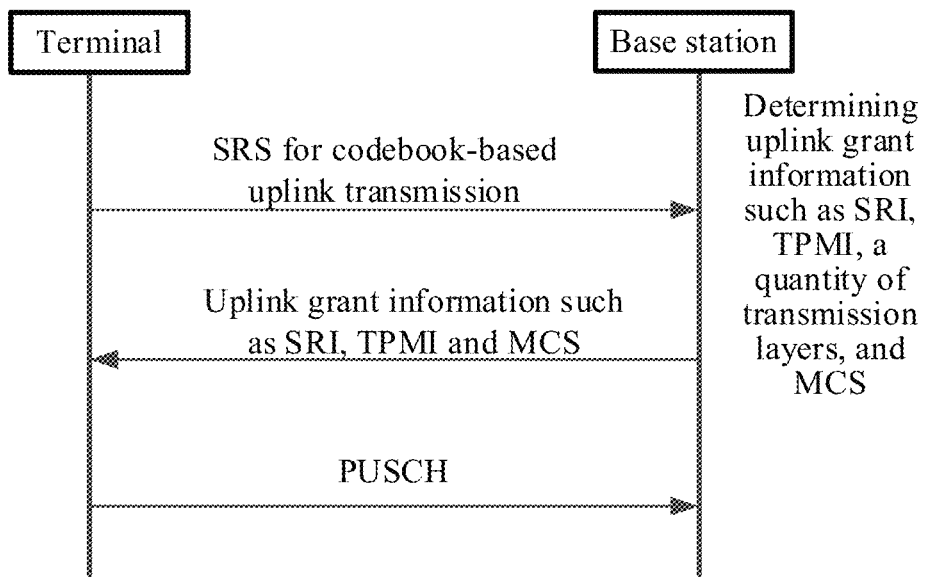
FIG. 1 shows a schematic flowchart of a codebook-based uplink transmission scheme in the related art.

Exemplary embodiments of the present disclosure will be described in more detail below with reference to the accompanying drawings. Although exemplary embodiments of the present disclosure are shown in the drawings, it should be understood that the present disclosure may be implemented in various forms, without being limited by the embodiments described herein. Rather, these embodiments are provided so that the present disclosure may be understood thoroughly, and will fully convey the scope of the present disclosure to those skilled in the art.

The terms "first", "second" and the like in the description and claims of the present application are used to distinguish similar objects, and are not necessarily used to describe a particular order or chronological order. It is to be understood that terms used in this way may be interchangeable under appropriate circumstances, so that embodiments of the present application described herein may be implemented in a sequence other than those illustrated or described herein. In addition, such terms as "inclue", "have" and any variants thereof are intended to cover non-exclusive inclusions, for example, a process, a method, a system, a product, or a device that includes a series of steps or units is not necessarily limited to those steps or units clearly listed, but may include other steps or units not explicitly listed or inherent in such process, method, product or device. Use of "and/or" in the description and claims represents at least one of connected objects.

The techniques described herein are not limited to LTE/LTE-Advanced (LTE-A) and NR systems, and may also be used for various wireless communication systems such as code division multiple access (CDMA), time division multiple access (TDMA), frequency division multiple access (FDMA), orthogonal frequency division multiple access (OFDMA), single-carrier frequency-division multiple access (SC-FDMA), and other systems. Terms "system" and "network" are often used interchangeably. A CDMA system may implement a radio technology such as CDMA2000, and universal terrestrial radio access (UTRA). UTRA includes wideband code division multiple access (WCDMA) and other variants of CDMA. A TDMA system may implement a radio technology such as global system for mobile communications (GSM). An OFDMA system may implement a radio technology such as ultra mobile broadband (UMB), evolved UTRA (E-UTRA), IEEE 1102.11 (Wireless Fidelity, Wi-Fi), IEEE 1102.16 (WiMAX), IEEE 1102.20, or Flash-OFDM. UTRA and E-UTRA are parts of universal mobile telecommunication system (UMTS). LTE and more advanced LTE (e.g., LTE-A) are new UMTS versions that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an NR system for purposes of example, and NR terminology is used in much of the description below, although the techniques are applicable in applications beyond NR systems.

The following description provides examples, and by no means constitutes a limitation of the scope, applicability, or configuration set forth in the claims. Changes may be made in the function and arrangement of discussed elements without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Figure 2:
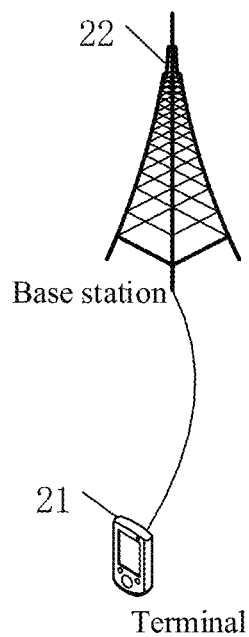
FIG. 2 shows a block diagram of a wireless communication system to which the embodiments of the present disclosure can be applied.

Referring to FIG. 2, FIG. 2 shows a block diagram of a wireless communication system to which the embodiments of the present disclosure can be applied. The wireless communication system includes a terminal 21 and a base station 22. The terminal 21 may also be called a user terminal or UE (User Equipment), and the terminal 21 may be a terminal side device such as a mobile phone, a tablet personal computer, a laptop computer, a personal digital assistant (PDA), a mobile internet device (MID), a wearable device or a vehicle-mounted device. It should be noted, a specific type of the terminal 21 is not limited in embodiments of the present disclosure. The base station 22 may be a 5G or later version of base station (e.g., gNB, 5G NR NB and the like), or a base station in another communication system (e.g., eNB, WLAN access point, or other access points, etc.), wherein the base station may be referred to as Node B, evolved Node B, access point, base transceiver station (BTS), radio base station, radio transceiver, basic service set (BSS), extended service Set (ESS), Node B, Evolved Node B (eNB), Home Node B, Home Evolved Node B, WLAN access point, WiFi Node or other suitable terminology in the field. As long as a same technical effect is achieved, the base station is not limited to a specific technical terminology. It is noted, although a base station in a NR system is used as an example in the embodiments of the present disclosure, a specific type of the base station is not limited thereto.

The base station 22 may communicate with the terminal 21 under the control of a base station controller. In various examples, the base station controller may be a part of a core network or some base stations. Some base stations may communicate control information or user data with the core network via a backhaul. In some examples, some of these base stations may directly or indirectly communicate with each other via a backhaul link, which may be a wired or wireless communication link. The wireless communication system may support operations on multiple carriers (waveform signals of different frequencies). A multi-carrier transmitter may simultaneously transmit modulated signals on the multiple carriers. For example, each communication link may be a multi-carrier signal modulated according to various radio technologies. Each modulated signal may be transmitted on a different carrier and may carry control information (e.g., a reference signal, a control channel, etc.), overhead information, data, etc.

The base station 22 may wirelessly communicate with the terminal 21 via one or more access point antennas. Each base station may provide communication coverage for its corresponding coverage area. The coverage area of an access point may be divided into sectors that each constitute only a part of the coverage area. The wireless communication system may include different types of base stations (for example, macro base stations, micro base stations or pico base stations). The base stations may also utilize different radio technologies, such as cellular or WLAN radio access technologies. The base stations may be associated with a same access network or operator deployment or associated with different access networks or operator deployments. The coverage areas of different base stations (including coverage areas of the same type or different types of base stations, coverage areas using the same radio technology or different radio technologies, or coverage areas belonging to the same access network or different access networks) may overlap with each other.

A communication link in the wireless communication system may include an uplink (UL) for carrying uplink transmission (for example, from the terminal 21 to the base station 22), or a terminal for carrying downlink (DL) transmission (for example, from the base station 22 to the user equipment 21). The UL transmission may also be referred to as reverse link transmission, and the DL transmission may also be referred to as forward link transmission. The downlink transmission may be performed by using a licensed frequency band, an unlicensed frequency band, or both. Similarly, the uplink transmission may be performed by using a licensed frequency band, an unlicensed frequency band or both.

To facilitate an understanding of the solutions of the embodiments of the present disclosure, the principle of cyclic delay diversity (CCD) is briefly introduced herein.

The basic principle of CDD is to cyclically shift signals to be transmitted on multiple antennas used by the transmitter and then transmit the signals in parallel. By means of the cyclically delayed transmission of signals, cyclic delay diversity transforms space diversity into frequency diversity. FIG. 3 shows an example in which the cyclic delay of CDD occurs before the cyclic prefix. At this time, the equivalent time delay offset is not limited by the CP, and the frequency selectivity of the equivalent channel can be improved without increasing the actual signal time delay spread. For the receiver, the cyclic time delay is equivalent to the change of the equivalent channel, so CDD can also be regarded as a type of space-time encoding, and does not increase the complexity of receiver. Of course, the cyclic delay of the CDD may also occur after the cyclic prefix, which may increase the actual signal time delay spread.

CDD can be used in conjunction with a spatial precoding technology. For example, the long-time-delay CDD technology used in the downlink TM3 of the LTE system is a technology that combines CDD and spatial precoding technology. The uplinks of conventional LTE and NR systems do not support the CDD scheme. There is a small cyclic shift between the signals transmitted by two antennas according to the small-time-delay CDD, and the channel experienced by the multiple antennas can be equivalent to a single-antenna channel with more paths introduced. Since the receiver does not need to perform special processing, the small-time-delay CDD can be used as a protocol-transparent transmission method. From the perspective of the time domain, the signal of the second antenna is only the signal of the first antenna plus a delay. Therefore, the second antenna can meet the low peak to average power ratio (PAPR) property of discrete Fourier transform-spread-OFDM (DFT-S-OFDM). Since the diversity is derived from the small time delay, the performance will be very sensitive to the length of the time delay. In addition, the small-time-delay CDD increases the total time delay of the equivalent channel, so the channel estimation performance may be reduced, too.

An embodiment of the present disclosure provides an uplink transmission method. By combining cyclic precoding or CDD with the UE's coherent transmission capability and/or codebook-based/non-codebook-based uplink transmission schemes, the method can improve the uplink transmission performance when the channel changes rapidly or the phase difference or power difference between terminal antennas changes rapidly by introducing transmission diversity gain. Referring to FIG. 4, an embodiment of the present disclosure provides an uplink transmission method. The method is applied to a terminal and includes a step 41.

Step 41, performing delay processing of an uplink signal on multiple antenna ports and then transmitting the uplink signal.

Here, optionally, the uplink signal may be one or more of PUSCH, physical uplink control channel (PUCCH), demodulation reference signal (DMRS) of PUSCH, and DMRS of PUCCH. Of course, the embodiment of the present disclosure is not limited to the above signals.

In the embodiment of the present disclosure, in the above step 41, the performing, by the terminal, delay processing of the uplink signal on multiple antenna ports and then transmitting, by the terminal, the uplink signal can introduce the transmission diversity gain to improve the uplink transmission performance when the channel changes rapidly or the phase difference or power difference between terminal antennas changes rapidly.

In the embodiment of the present disclosure, the terminal can perform delay processing of the uplink signal on multiple antenna ports in a precoding process and then transmitting the uplink signal.

As a first implementation, in the above step 41, the following formula can be used to perform precoding processing of the data stream of the uplink signal:

$$\begin{bmatrix} y^{(0)}(i) \\ M \\ y^{(P-1)}(i) \end{bmatrix} = D(i)W_0(i) \begin{bmatrix} x^{(0)}(i) \\ M \\ x^{(v-1)}(i) \end{bmatrix}$$

wherein, $x^{(u)}(i)$ represents a data symbol with an index i in a data stream with an index u of the uplink signal, v represents a quantity of data streams; $D(i)$ represents the square matrix with a dimension of P×P that corresponds to x(i), P represents a quantity of antenna ports configured for the terminal that correspond to the uplink signal; $x(i)=[x^{(0)}(i) \ldots x^{(v-1)}(i)]^T$, $i=0, 1, \ldots, M_{symb}^{layer}-1$ represents a signal symbol obtained after layer mapping and previous steps (such as coding, modulation, etc.) are performed on the uplink data (note that the uplink data here can be the data transmitted on PUSCH, or it can be data transmitted on PUCCH, etc.); $W_0(i)$ represents the reference precoding matrix with a dimension P×v that corresponds to x(i); $y^{(p)}(i)$ represents a symbol mapped to the antenna port p and corresponding to x(i), p represents the index of the antenna port. $y(i)=[\ldots y^{(p)}(i) \ldots]^T$, $i=0, 1 \ldots, M_{symb}^{ap}-1$ represents a symbol mapped to each antenna port that correspond to x(i), $M_{symb}^{layer}$ represents a quantity of data symbols included in one data layer, and $M_{symb}^{ap}$ represents a quantity of data symbols mapped to one antenna port.

Here, optionally, the reference precoding matrix $W_0(i)$ is a precoding matrix indicated by the base station to the terminal through the TPMI. For example, for the 3GPP NR system, depending on the grant mode of the PUSCH, the TPMI may be indicated by downlink control information (DCI) or by higher layer parameters.

Here, optionally, the reference precoding matrix $W_0(i)$ may also be a predefined precoding matrix. Table 3 shows an example of a predefined precoding matrix.

TABLE 3

| Quantity of data streams v | $W_0(i)$ |
|---|---|
| 1 | $\dfrac{1}{2}\begin{bmatrix} 1 \\ 1 \\ 1 \\ 1 \end{bmatrix}$ |

TABLE 3-continued

| Quantity of data streams υ | $W_0(i)$ |
|---|---|
| 2 | $\frac{1}{2}\begin{bmatrix} 1 & 0 \\ 0 & 1 \\ 1 & 0 \\ 0 & 1 \end{bmatrix}$ |
| 3 | $\frac{1}{2}\begin{bmatrix} 1 & 0 & 0 \\ 0 & 1 & 0 \\ 1 & 0 & 0 \\ 0 & 0 & 0 \\ 0 & 0 & 1 \end{bmatrix}$ |
| 4 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |

Optionally, the reference precoding matrix $W_0(i)$ may also be a precoding matrix selected from an uplink codebook. For the definition of the uplink codebook, a reference may be made to protocols in the related art.

The following is a detailed description of D(i) in the above formula.

As an optional manner, the D(i) may be a diagonal matrix, and elements on a main diagonal correspond to different phase offsets respectively. As an example, the value of the element $d(i)_{l,m}$ in the m-th row and m-th column of the D(i) may be determined in the following manner:

$$d(i)_{l,m} = \begin{cases} 0, & l \neq m \\ e^{-j(l-1)\theta_1 n_1/P}, & l = m \end{cases}.$$

Optionally, for 2-antenna-port uplink transmission:

$$D(i) = \begin{bmatrix} 1 & 0 \\ 0 & e^{-j\theta_1 n_1/2} \end{bmatrix}.$$

Optionally, for 4-antenna-port uplink transmission:

$$D(i) = \begin{bmatrix} 1 & 0 & 0 & 0 \\ 0 & e^{-j\theta_1 n_1/4} & 0 & 0 \\ 0 & 0 & e^{-j2\theta_1 n_1/4} & 0 \\ 0 & 0 & 0 & e^{-j3\theta_1 n_1/4} \end{bmatrix}.$$

As another option, the D(i) may be a square matrix related to the coherent transmission capability of the terminal. Optionally, D(i) may be a diagonal matrix related to the coherent transmission capability of the terminal.

That the D(i) may be related to the coherent transmission capability of the terminal means that different coherent transmission capabilities of the terminal may correspond to different D(i).

The coherent transmission capability of the terminal here may be the coherent transmission capability reported by the terminal to the base station. For example, in the 3GPP NR system, the protocol TS38.331 stipulates that the terminal can report the coherent transmission capability of the terminal to the base station through a parameter: puschTransCoherence. The parameter has three candidate values {nonCoherent, partialNonCoherent, fullCoherent}, where nonCoherent indicates that the terminal has a non-coherent transmission capability, partialNonCoherent indicates that the terminal has a partial-coherent transmission capability, and fullCoherent indicates that the terminal has a full-coherent transmission capability.

As another option, in a case that the terminal has a non-coherent transmission capability, the D(i) may be a diagonal matrix, and elements on a main diagonal correspond to different phase offsets respectively; when the terminal capability is full-coherent transmission, the D(i) may be an identity matrix; in a case that the terminal has a partial-coherent transmission capability, the D(i) may be a diagonal matrix, and elements corresponding to a same coherent transmission antenna group have a same phase offset, and elements corresponding to different coherent transmission antenna groups have different phase offsets. As an example, the value of the element $d(i)_{l,m}$ in the l-th row and m-th column of the D(i) may be determined in the following manner:

in a case that the terminal has a non-coherent transmission capability, $$d(i)_{l,m} = \begin{cases} 0, & l \neq m \\ e^{-j(l-1)\theta_2 n_1/P}, & l = m \end{cases};$$

in a case that the terminal has a full-coherent transmission capability, $$d(i)_{l,m} = \begin{cases} 0, & l \neq m \\ 1, & l = m \end{cases};$$

in a case that the terminal has a partial-coherent transmission capability, $$d(i)_{l,m} = \begin{cases} 0, & l \neq m \\ e^{-ja_z\theta_3 n_1/P}, & l = m \end{cases};$$

wherein $a_z$ is the coefficient corresponding to the z-th coherent transmission antenna group;

each of $\theta_1$, $\theta_2$ and $\theta_3$ is a predetermined angle value; $n_1$ is an integer greater than 0.

Specifically, the value of the $\theta_1$, $\theta_2$ or $\theta_3$ may be determined by the terminal itself; or;

the value of the $\theta_1$, $\theta_2$ or $\theta_3$ may be determined by the terminal according to a pre-agreed first angle threshold, and is not greater than the first angle threshold; or, the value of the $\theta_1$, $\theta_2$ or $\theta_3$ may be determined by the terminal according to a second angle threshold sent by a base station, and is not greater than the second angle threshold; or, the value of the $\theta_1$, $\theta_2$ or $\theta_3$ may be a value stipulated in protocol; or the value of the $\theta_1$, $\theta_2$ or $\theta_3$ may be a value determined according to the scheduling bandwidth of the uplink signal; or the value of the $\theta_1$, $\theta_2$ or $\theta_3$ may be a value determined according to the subband bandwidth in the scheduling bandwidth of the uplink signal; or, the value of the $\theta_1$, $\theta_2$ or $\theta_3$ is indicated to the terminal by the base station through signaling.

Optionally, $\theta_1$, $\theta_2$ or $\theta_3$ is denoted by $\theta$, and $\theta$ may have the following values.

(1) a value determined by the terminal itself.

(2) A value determined by the terminal itself and not greater than $\theta_{thred}$, where $\theta_{thred}$ is stipulated in a protocol.

(3) A value determined by the terminal itself and not greater than $\theta_{thred}$, where $\theta_{thred}$ is sent by the base station to the terminal through signaling. The signaling may be radio resource control (RRC) signaling, medium access control control element (MAC CE) signaling, or DCI signaling.

(4) A value stipulated in the protocol.

(5) The value of $\theta$ is determined by the scheduling bandwidth of the uplink signal. For example, the value of $\theta$ should satisfy the condition that the total phase change within the scheduling bandwidth is not less than $C\pi$, where C is an integer. Optionally, C may be a value predetermined by the terminal and the base station in advance. For example, the value of $\theta$ should satisfy the condition that the total phase change within the scheduling bandwidth is not greater than $C\pi$.

(6) The value of $\theta$ is determined by the bandwidth of the cyclic shift subband hereinafter. For example, the value of $\theta$ should satisfy the condition that the total phase change in the cyclic shift subband is not less than $C\pi$, where C is an integer. Optionally, C may be a value predetermined by the terminal and the base station in advance. For another example, the value of $\theta$ should satisfy the condition that the total phase change in the cyclic shift subband is not greater than $C\pi$.

(7) The value of $\theta$ is indicated by the base station to the terminal through signaling.

Here, the determination of the value of the D(i) may include: the terminal receives an indication message sent by the base station for determining the D(i) and then uses the indication message to determine the D(i).

Optionally, the base station directly or indirectly indicates D(i) to the terminal (UE) through signaling. Manners of indirectly indicating D(i) include, but are not limited to: the base station indicates the determination rule of D(i) to the UE; the base station indicates the parameter for determining D(i) to the UE, and so on. The signaling may be RRC signaling, MAC-CE signaling, physical layer signaling, and so on. Optionally, the signaling is RRC signaling.

Optionally, UE sends the D(i) expected by the UE to the base station. It may be in direct or indirect ways. For example: UE sends the rule for determining the D(i) expected by the UE to the base station; UE sends the parameter for determining the D(i) expected by the UE to the base station, and so on. Multiple sets of candidate information may be included in the D(i) expected by the UE that is sent by the UE to the base station. Optionally, the base station determines D(i) used in uplink signal transmission by the UE according to the D(i) expected by the UE that is sent by the UE, and indicates the D(i) to the UE. Optionally, there is only one set of candidate values in the D(i) expected by the UE that is sent by the UE to the base station, and the base station assumes that D(i) actually used in uplink signal transmission by the UE is the D(i) expected by the UE that is sent by the UE to the base station.

Optionally, the UE sends to the base station D(i) used by the UE to transmit the uplink signal. It may be in direct or indirect ways. For example: the UE sends to the base station the rule for determining D(i) used by the UE to transmit the uplink signal; the UE sends to the base station the parameter used by the UE to determine D(i) for transmitting the uplink signal, and so on. Correspondingly, the base station receives the uplink signal and related information (for example, the demodulation reference signal of the uplink signal) according to the D(i) sent by the UE and used by the UE to transmit the uplink signal.

Optionally, for 2-antenna-port uplink transmission:

in a case that the terminal has a non-coherent transmission capability, $$D(i) = \begin{bmatrix} 1 & 0 \\ 0 & e^{-j\theta_2 n_1/2} \end{bmatrix};$$

in a case that the terminal has a full-coherent transmission capability, $$D(i) = \begin{bmatrix} 1 & 0 \\ 0 & 1 \end{bmatrix}.$$

Optionally, for 4-antenna-port uplink transmission:

in a case that the terminal has a non-coherent transmission capability, $$D(i) = \begin{bmatrix} 1 & 0 & 0 & 0 \\ 0 & e^{-j\theta_2 n_1/4} & 0 & 0 \\ 0 & 0 & e^{-j2\theta_2 n_1/4} & 0 \\ 0 & 0 & 0 & e^{-j3\theta_2 n_1/4} \end{bmatrix};$$

in a case that the terminal has a full-coherent transmission capability, $$D(i) = \begin{bmatrix} 1 & 0 & 0 & 0 \\ 0 & 1 & 0 & 0 \\ 0 & 0 & 1 & 0 \\ 0 & 0 & 0 & 1 \end{bmatrix};$$

in a case that the terminal has a partial-coherent transmission capability, $$D(i) = \begin{bmatrix} 1 & 0 & 0 & 0 \\ 0 & e^{-j\theta_3 n_1/4} & 0 & 0 \\ 0 & 0 & 1 & 0 \\ 0 & 0 & 0 & e^{-j\theta_3 n_1/4} \end{bmatrix}.$$

Through the above D(i), the embodiment of the present disclosure can introduce phase offset on the basis of the reference precoding matrix, so as to realize the delay processing of the uplink signal, and introduce the transmission diversity gain, which can improve the uplink transmission performance when the channel changes rapidly or the phase difference or power difference between terminal antennas changes rapidly.

In the embodiment of the present disclosure, it is assumed that the scheduling bandwidth of the uplink signal includes B subbands, where B is an integer greater than or equal to 1. In the process of delay processing of the uplink signal on multiple antenna ports, the D(i) may be used to process data symbols of the uplink signal that are mapped within each subband or between subbands, and the value of D(i) is cyclically changed to realize a cyclic delay processing.

As a specific example, when cyclic delay processing is performed between subbands, each x(i) mapped to the same subband corresponds to the same D(i), and there is a predetermined rule between the value of D(i) and the number or frequency of the subband. That is, the value of D(i) is a function of the number or frequency of the subband. For example, in D(i) to which each x(i) mapped to the same subband corresponds, the value of $n_1$ is the same, and the value of $n_1$ increases or decreases with increasing frequencies corresponding to the subbands. More specifically, the subbands may be numbered from 1 to B in a frequency-increasing manner, and then $n_1$ is equal to the number of the subband where a resource element is located, wherein x(i) is to be mapped to the resource element, or $n_1$ is equal to a sum of the number of the subband where the resource element to which x(i) is to be mapped is located and a preset offset, and so on.

When cyclic delay processing is performed within the subband, the value of D(i) to which each x(i) mapped to the same subband corresponds is determined according to the frequency domain position of the resource element (RE) corresponding to the x(i) in the subband. For example, in D(i) to which each x(i) mapped to the same subband corresponds, the value of $n_1$ is determined according to the frequency domain position of the resource element corresponding to x(i) in the subband, and the value of $n_1$ increases or decreases as the frequency of the resource element corresponding to x(i) increases. More specifically, the resource elements occupied by the data symbols may be numbered from 1 in a frequency-increasing manner in one of the subbands, and $n_1$ is equal to the number of the data symbol of the x(i) in the subband.

Here, the reference precoding matrix may be a precoding matrix indicated by the base station to the terminal through a TPMI; or, the reference precoding matrix is a predefined precoding matrix; or, the reference precoding matrix is a precoding matrix selected from the uplink codebook.

As a second implementation, in the above step 41, the following formula may be used to perform precoding processing of the data stream of the uplink signal:

$$\begin{bmatrix} y^{(0)}(i) \\ M \\ y^{(P-1)}(i) \end{bmatrix} = W_1(i) \begin{bmatrix} x^{(0)}(i) \\ M \\ x^{(v-1)}(i) \end{bmatrix}$$

wherein, $x^{(u)}(i)$ represents the data symbol with an index i in the data stream with an index u of the uplink signal; v represents the quantity of data streams; P represents the quantity of antenna ports configured for the terminal that correspond to the uplink signal; $x(i)=[x^{(0)}(i) \ldots x^{(v-1)}(i)]^T$; $W_1(i)$ represents a precoding matrix with a dimension of P×v in a precoding matrix group in a candidate precoding matrix set $W_1^s(i)$, for example, the $(q_1+1)$-th codeword of the m-th precoding matrix group; $y^{(p)}(i)$ represents a symbol mapped to the antenna port p and corresponding to x(i), and p represents an index of the antenna port;

the candidate precoding matrix set $W_1^s(i)$ includes R precoding matrix groups, wherein the q-th precoding matrix $W_{q,s}$ in the r-th precoding matrix group satisfies $W_{q,s}=D^qW_r$; $D^q$ represents the q-th codeword in the first candidate codeword set formed by a square matrix with a dimension of P×P; $W_r$ represents a reference precoding matrix with a dimension of P×v that corresponds to the r-th precoding matrix group.

Here, the reference precoding matrix corresponding to the uplink signal may be a precoding matrix indicated by the base station to the terminal through a TPMI; or, the reference precoding matrix is a predefined precoding matrix; or, the reference precoding matrix is a precoding matrix selected from the uplink codebook.

The first candidate codeword set may be determined in the following manner: the terminal receives an indication message sent by the base station for determining the first candidate codeword set, and then uses the indication message to determine the precoding matrix included in the first candidate codeword set.

The $D^q$ may be determined by the terminal using an indication message after the terminal receives the indication message sent by the base station for determining the $D^q$.

The following specifically describes any codeword $D^q$ in the above first candidate codeword set.

Assuming that the scheduling bandwidth of the uplink signal includes B subbands, where B is an integer greater than or equal to 1, each x(i) mapped to a same subband corresponds to a same $W_1(i)$, and there is a predetermined rule between a value of the $W_1(i)$ and a number or frequency of the subband; or, a value of $W_1(i)$ corresponding to each x(i) mapped to the same subband is determined according to a frequency domain position of a resource element corresponding to the x(i) in the subband Similarly, as an option, any codeword $D^q$ in the first candidate codeword set may be a diagonal matrix, and elements on a main diagonal correspond to different phase offsets respectively. As an example, the value of the element $d_{l,m}$ in the l-th row and m-th column of the $D^q$ may be determined in the following manner:

$$d_{l,m} = \begin{cases} 0, & l \neq m \\ e^{-j(l-1)\theta_1 n_2/P}, & l = m \end{cases}.$$

As another option, in a case that the terminal has a non-coherent transmission capability, any codeword $D^q$ in the first candidate codeword set is a diagonal matrix, and elements on a main diagonal correspond to different phase offsets respectively; in a case that the terminal has a full-coherent transmission capability, any codeword $D^q$ in the first candidate codeword set is an identity matrix; in a case that the terminal has a partial-coherent transmission capability, any codeword $D^q$ in the first candidate codeword set is a diagonal matrix, and elements corresponding to a same coherent transmission antenna group have a same phase offset, the elements corresponding to different coherent transmission antenna groups have different phase offsets. As an example, the value of the element $d(i)_{l,m}$ in the l-th row and m-th column of the $D^q$ may be determined in the following manner:

in a case that the terminal has a non-coherent transmission capability, $$d_{l,m} = \begin{cases} 0, & l \neq m \\ e^{-j(l-1)\theta_2 n_2/P}, & l = m \end{cases};$$

in a case that the terminal has a full-coherent transmission capability, $$d_{l,m} = \begin{cases} 0, & l \neq m \\ 1, & l = m \end{cases};$$

in a case that the terminal has a partial-coherent transmission capability, $$d_{l,m} = \begin{cases} 0, & l \neq m \\ e^{-ja_z\theta_3 n_2/P}, & l = m \end{cases};$$

wherein, $a_z$ is the coefficient corresponding to the z-th coherent transmission antenna group; each of the $\theta_1$, $\theta_2$ and $\theta_3$ is a predetermined angle value; the value of $n_2$ ranges from 1 to M, where M is an integer greater than 1. Optionally, the M may be the ratio of a common multiple of $\theta_2$ and $2\pi$ to $\theta_2$, for example, the ratio of the minimal common multiple of $\theta_2$ and $2\pi$ to $\theta_2$.

Specifically, the value of the $\theta_1$, $\theta_2$ or $\theta_3$ may be determined by the terminal itself; or, the value of the $\theta_1$, $\theta_2$ or $\theta_3$ may be determined by the terminal according to a pre-agreed first angle threshold, and is not greater than the first angle threshold; or, the value of the $\theta_1$, $\theta_2$ or $\theta_3$ may be determined by the terminal according to a second angle threshold sent by a base station, and is not greater than the second angle threshold; or, the value of the $\theta_1$, $\theta_2$ or $\theta_3$ may be a value stipulated in protocol; or, the value of the $\theta_1$, $\theta_2$ or $\theta_3$ may be a value determined according to the scheduling bandwidth of the uplink signal; or, the value of the $\theta_1$, $\theta_2$ or $\theta_3$ may be a value determined according to the subband bandwidth in the scheduling bandwidth of the uplink signal; or, the value of the $\theta_1$, $\theta_2$ or $\theta_3$ is indicated to the terminal by the base station through signaling.

Optionally, $\theta_1$, $\theta_2$ or $\theta_3$ is denoted by $\theta$, and $\theta$ may have the following values.

(1) a value determined by the terminal itself.

(2) A value determined by the terminal itself and not greater than $\theta_{thred}$, where $\theta_{thred}$ is stipulated in a protocol.

(3) A value determined by the terminal itself and not greater than $\theta_{thred}$, where $\theta_{thred}$ is sent by the base station to the terminal through signaling. The signaling may be RRC signaling, MAC CE signaling, or DCI signaling.

(4) A value stipulated in the protocol.

(5) The value of $\theta$ is determined by the scheduling bandwidth of the uplink signal. For example, the value of $\theta$ should satisfy the condition that the total phase change within the scheduling bandwidth is not less than $C\pi$, where C is an integer. Optionally, C may be a value predetermined by the terminal and the base station in advance. For example, the value of $\theta$ should satisfy the condition that the total phase change within the scheduling bandwidth is not greater than $C\pi$.

(6) The value of $\theta$ is determined by the bandwidth of the cyclic shift subband hereinafter. For example, the value of $\theta$ should satisfy the condition that the total phase change in the cyclic shift subband is not less than $C\pi$, where C is an integer. Optionally, C may be a value predetermined by the terminal and the base station in advance. For another example, the value of $\theta$ should satisfy the condition that the total phase change in the cyclic shift subband is not greater than $C\pi$.

(7) The value of $\theta$ is indicated by the base station to the terminal through signaling.

In the above second implementation, the terminal (UE) can perform cyclic precoding (or cyclic delay diversity) transmission in each cyclic shift subband within the entire frequency band allocated by the base station for the uplink signal, or perform cyclic precoding (or cyclic delay diversity) transmission between cyclic shift subbands.

Implementation 1: for cyclic precoding transmission within a cyclic shift subband The UE performs cyclic precoding (or cyclic delay diversity) transmission in each cyclic shift subband within the entire frequency band allocated by the base station for the uplink signal. It is assumed that the UE divides the cyclic shift subbands with a granularity of G (for example, the precoding granularity is G RBs) in the entire frequency band allocated by the base station for the uplink signal. G may be indicated to the UE by the base station through signaling, or stipulated in a protocol, or determined by the UE. G may be 1 RB, or a group of RBs, or the entire frequency band of the uplink signal. Assuming that the precoding matrix indicated by the base station to the terminal through the TPMI is $W_1(i)$, within the time-frequency resource range included in a cyclic shift subband, the UE performs cyclic precoding by using codewords in the codeword group generated (or preset) according to a certain rule. The cyclic precoding refers to precoding the first data symbol within this granularity using the first codeword, and precoding the second data symbol within this granularity using the second codeword, . . . , precoding the n-th symbol within this granularity with the mod(K,n)-th codeword, . . . . Optionally, K is the ratio of the minimal common multiple of $\theta$ and $2\pi$ to $\theta$. For example, the uplink signal is PUSCH, the cyclic shift granularity G is 1 RB, and 12 REs are allocated for PUSCH in the first PRB scheduled for PUSCH, and K=4, then for the first RE corresponding to PUSCH in this PRB, the codeword with a codeword number of 1 is used as W(i); for the second RE corresponding to PUSCH in this PRB, the codeword with a codeword number of 2 is used as W(i); . . . ; for the fourth RE corresponding to PUSCH in this PRB, the codeword with a codeword number of 4 is used as W(i); for the fifth RE corresponding to PUSCH in this PRB, the codeword with a codeword number of 1 is used as W(i); and for the sixth RE corresponding to PUSCH in this PRB, the codeword with a codeword number of 2 is used as W(i), . . . . Optionally, the scheduling bandwidth of the uplink signal includes one cyclic shift subband, that is, the size of the cyclic shift subband is the scheduling bandwidth of the uplink signal, and the scheduling bandwidth of the uplink signal is not divided into subbands.

A way of defining the codeword group generated (or preset) according to a certain rule is:
With Two Antenna Ports:

| Codeword number | W(i) |
|---|---|
| 1 | $\begin{bmatrix} 1 & 0 \\ 0 & e^{-j\theta/2} \end{bmatrix} W_1(i)$ |
| 2 | $\begin{bmatrix} 1 & 0 \\ 0 & e^{-j2\theta/2} \end{bmatrix} W_1(i)$ |

-continued

| Codeword number | W(i) |
|---|---|
| 3 | $\begin{bmatrix} 1 & 0 \\ 0 & e^{-j3\theta/2} \end{bmatrix} W_1(i)$ |
| ... | ... |
| m | $\begin{bmatrix} 1 & 0 \\ 0 & e^{-jm\theta/2} \end{bmatrix} W_1(i)$ |
| ... | ... |
| M | $\begin{bmatrix} 1 & 0 \\ 0 & e^{-jM\theta/2} \end{bmatrix} W_1(i)$ |

With Four Antenna Ports:

| Codeword number | W(i) |
|---|---|
| 1 | $\begin{bmatrix} 1 & 0 & 0 & 0 \\ 0 & e^{-j\theta/4} & 0 & 0 \\ 0 & 0 & e^{-j2\theta/4} & 0 \\ 0 & 0 & 0 & e^{-j3\theta/4} \end{bmatrix} W_1(i)$ |
| 2 | $\begin{bmatrix} 1 & 0 & 0 & 0 \\ 0 & e^{-j2\theta/4} & 0 & 0 \\ 0 & 0 & e^{-j4\theta/4} & 0 \\ 0 & 0 & 0 & e^{-j6\theta/4} \end{bmatrix} W_1(i)$ |
| 3 | $\begin{bmatrix} 1 & 0 & 0 & 0 \\ 0 & e^{-j3\theta/4} & 0 & 0 \\ 0 & 0 & e^{-j6\theta/4} & 0 \\ 0 & 0 & 0 & e^{-j9\theta/4} \end{bmatrix} W_1(i)$ |
| ... | ... |
| m | $\begin{bmatrix} 1 & 0 & 0 & 0 \\ 0 & e^{-j\theta m/4} & 0 & 0 \\ 0 & 0 & e^{-j2\theta m/4} & 0 \\ 0 & 0 & 0 & e^{-j3\theta m/4} \end{bmatrix} W_1(i)$ |
| ... | ... |
| M | $\begin{bmatrix} 1 & 0 & 0 & 0 \\ 0 & e^{-j\theta M/4} & 0 & 0 \\ 0 & 0 & e^{-j2\theta M/4} & 0 \\ 0 & 0 & 0 & e^{-j3\theta M/4} \end{bmatrix} W_1(i)$ |

Another way of defining the codeword group generated (or preset) according to a certain rule is:

With Two Antenna Ports:

| Codeword number | W(i) |
|---|---|
| 1 | $\begin{bmatrix} 1 & 0 \\ 0 & e^{-j\theta/2} \end{bmatrix} W_1(i)$ |
| 2 | $\begin{bmatrix} 1 & 0 \\ 0 & e^{-j2\theta/2} \end{bmatrix} W_1(i)$ |
| 3 | $\begin{bmatrix} 1 & 0 \\ 0 & e^{-j3\theta/2} \end{bmatrix} W_1(i)$ |
| ... | ... |
| m | $\begin{bmatrix} 1 & 0 \\ 0 & e^{-jm\theta/2} \end{bmatrix} W_1(i)$ |
| ... | ... |
| M | $\begin{bmatrix} 1 & 0 \\ 0 & e^{-jM\theta/2} \end{bmatrix} W_1(i)$ |

With Four Antenna Ports:

1) In a case that the terminal has a non-coherent transmission capability:

| Codeword number | W(i) |
|---|---|
| 1 | $\begin{bmatrix} 1 & 0 & 0 & 0 \\ 0 & e^{-j\theta/4} & 0 & 0 \\ 0 & 0 & e^{-j2\theta/4} & 0 \\ 0 & 0 & 0 & e^{-j3\theta/4} \end{bmatrix} W_1(i)$ |
| 2 | $\begin{bmatrix} 1 & 0 & 0 & 0 \\ 0 & e^{-j2\theta/4} & 0 & 0 \\ 0 & 0 & e^{-j4\theta/4} & 0 \\ 0 & 0 & 0 & e^{-j6\theta/4} \end{bmatrix} W_1(i)$ |
| 3 | $\begin{bmatrix} 1 & 0 & 0 & 0 \\ 0 & e^{-j3\theta/4} & 0 & 0 \\ 0 & 0 & e^{-j6\theta/4} & 0 \\ 0 & 0 & 0 & e^{-j9\theta/4} \end{bmatrix} W_1(i)$ |
| ... | ... |
| m | $\begin{bmatrix} 1 & 0 & 0 & 0 \\ 0 & e^{-j\theta m/4} & 0 & 0 \\ 0 & 0 & e^{-j2\theta m/4} & 0 \\ 0 & 0 & 0 & e^{-j3\theta m/4} \end{bmatrix} W_1(i)$ |
| ... | ... |
| M | $\begin{bmatrix} 1 & 0 & 0 & 0 \\ 0 & e^{-j\theta M/4} & 0 & 0 \\ 0 & 0 & e^{-j2\theta M/4} & 0 \\ 0 & 0 & 0 & e^{-j3\theta M/4} \end{bmatrix} W_1(i)$ |

2) In a case that the terminal has a partial-coherent transmission capability:

| Codeword number | W(i) |
|---|---|
| 1 | $\begin{bmatrix} 1 & 0 & 0 & 0 \\ 0 & e^{-j\theta/4} & 0 & 0 \\ 0 & 0 & 1 & 0 \\ 0 & 0 & 0 & e^{-j\theta/4} \end{bmatrix} W_1(i)$ |
| 2 | $\begin{bmatrix} 1 & 0 & 0 & 0 \\ 0 & e^{-j2\theta/4} & 0 & 0 \\ 0 & 0 & 1 & 0 \\ 0 & 0 & 0 & e^{-j2\theta/4} \end{bmatrix} W_1(i)$ |
| 3 | $\begin{bmatrix} 1 & 0 & 0 & 0 \\ 0 & e^{-j3\theta/4} & 0 & 0 \\ 0 & 0 & 1 & 0 \\ 0 & 0 & 0 & e^{-j3\theta/4} \end{bmatrix} W_1(i)$ |
| ... | ... |
| m | $\begin{bmatrix} 1 & 0 & 0 & 0 \\ 0 & e^{-j\theta m/4} & 0 & 0 \\ 0 & 0 & 1 & 0 \\ 0 & 0 & 0 & e^{-j\theta m/4} \end{bmatrix} W_1(i)$ |
| ... | ... |
| M | $\begin{bmatrix} 1 & 0 & 0 & 0 \\ 0 & e^{-j\theta M/4} & 0 & 0 \\ 0 & 0 & 1 & 0 \\ 0 & 0 & 0 & e^{-j\theta M/4} \end{bmatrix} W_1(i)$ |

3) In a case that the terminal has a full-coherent transmission capability: W (i)=$W_1$(i).

It should be understood that, in this way, $\theta$ in the codebook for the UE with non-coherent transmission capability and $\theta$ in the codebook for the UE with partial-coherent transmission capability may be the same value or different values.

Another way of defining the codeword group generated (or preset) according to a certain rule is:

For 2 Antenna Ports:

| Codeword number | W(i) |
|---|---|
| 0-2 | $\frac{1}{\sqrt{2}}\begin{bmatrix} 1 & 0 \\ 0 & 1 \end{bmatrix} W_1(i) \quad \frac{1}{2}\begin{bmatrix} 1 & 1 \\ 1 & -1 \end{bmatrix} W_1(i) \quad \frac{1}{2}\begin{bmatrix} 1 & 1 \\ j & -j \end{bmatrix} W_1(i)$ |

For 4 Antenna Ports:

| Codeword number | W(i) |
|---|---|
| 0-3 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix} W_1(i) \quad \frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix} W_1(i) \quad \frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix} W_1(i) \quad \frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix} W_1(i)$ |
| 4 | $\frac{1}{4}\begin{bmatrix} 1 & 1 & 1 & 1 \\ 1 & -1 & 1 & -1 \\ j & j & -j & -j \\ j & -j & -j & j \end{bmatrix} W_1(i)$ |

Implementation 2: For Cyclic Precoding Transmission Between Cyclic Shift Subbands:

The UE performs cyclic delay diversity transmission with a granularity of N within the entire frequency band allocated by the base station for the uplink signal (in this case, it can be considered that the precoding granularity of the UE is N RBs). N may be indicated to the UE by the base station through signaling, or stipulated in a protocol. Assuming that the precoding matrix indicated by the base station to the terminal through the TPMI is $W_1(i)$, the UE performs cyclic precoding with the precoding granularity N within the frequency band by using the codewords in the predefined codeword group. The cyclic precoding with the precoding granularity N means precoding the data symbols of the first group of N RBs by using the first codeword, precoding the data symbols of the second group of N RBs by using the second codeword, . . . , and precoding the data symbols of the n-th group of N RBs by using the mod(M,n)-th codeword, . . . . Optionally, M is the ratio of the minimal common multiple of θ and 2π to θ. For example, the uplink signal is PUSCH, the granularity of precoding is N=4 RBs, and M=4, then for 4 PRBs scheduled for PUSCH that have the minimum numbers, the codeword with the codeword number of 1 in the predefined codeword group is used as W(i); for 4 PRBs having the sub-minimum numbers, the codeword with the codeword number of 2 in the predefined codeword group is used as W(i); . . . . The definition of the predefined codeword group may be as shown in the schemes in the implementation 2.

Optionally, the base station directly or indirectly indicates the codeword group generated (or preset) according to a certain rule to the (UE) through signaling. Manners of indirectly indicating the codeword group include, but are not limited to: the base station indicates the generation rule of codeword group to the UE; the base station indicates the parameter for determining the codeword group to the UE, and so on. The signaling may be RRC signaling, MAC-CE signaling, physical layer signaling (e.g., indicated by DCI), and so on. Optionally, the signaling is RRC signaling.

Optionally, the UE sends to the base station the codeword group expected by the UE and generated (or preset) according to a certain rule. It may be in direct or indirect ways. For example: UE sends to the base station the rule for determining the codeword group expected by the UE; UE sends to the base station the parameter for determining the codeword groups expected by the UE, and so on. Multiple sets of candidate information may be included in the codeword group expected by the UE that is sent by the UE to the base station. Optionally, the base station determines a codeword group used by the UE for uplink signal transmission according to the codeword group expected and sent by the UE, and indicate the determined codeword group to the UE. Optionally, there is only one set of candidate values in the codeword group expected and sent by the UE to the base station, and the base station assumes that the codeword group actually used in uplink signal transmission by the UE is the codeword group expected and sent by the UE to the base station.

Optionally, the UE send to the base station the codeword group generated (or preset) according to a certain rule and used by the UE to transmit the uplink signal. It may be in direct or indirect ways. For example: UE sends to the base station the rule for determining the codeword group expected by the UE; UE sends to the base station the parameter for determining the codeword groups expected by the UE, and so on. Correspondingly, the base station receives the uplink signal and related information (for example, the demodulation reference signal of the uplink signal) according to the codeword group sent by the UE and used by the UE to transmit the uplink signal.

Through the above $W_1(i)$, the embodiment of the present disclosure can introduce phase offset on the basis of the reference precoding matrix, so as to realize the delay processing of the uplink signal, and introduce the transmission diversity gain, which can improve the uplink transmission performance when the channel changes rapidly or the phase difference or power difference between terminal antennas changes rapidly.

In the embodiment of the present disclosure, it is assumed that the scheduling bandwidth of the uplink signal includes B subbands, where B is an integer greater than or equal to 1. In the process of delay processing of the uplink signal on multiple antenna ports, the $W_1(i)$ may be used to perform precoding processing of the data symbols of the uplink signal that are mapped within each subband or between subbands, and the value of $W_1(i)$ is cyclically changed to realize a cyclic delay processing.

As a specific example, it is assumed that the scheduling bandwidth of the uplink signal includes B subbands, where B is an integer greater than or equal to 1. When cyclic delay processing is performed between the subbands, all data symbols mapped to the same subband correspond to the same $n_2$, the value of $n_2$ increases or decreases with increasing frequencies corresponding to the subbands; when the cyclic delay processing is performed within the subband, the value of $n_2$ is determined according to the frequency domain position of the resource element corresponding to the data symbol $x^{(j)}(i)$ in the subband where the resource element is located, and the value of $n_2$ increases or decreases as the frequency of the resource element corresponding to the data symbol increases.

More specifically, when the cyclic delay processing is performed within the subband, in a case that the index of the time-frequency resource to which the x(i) is to be mapped in the subband in which the time-frequency resource is located is $L_1$, the codeword $W_1(i)$ is the $(K_1+1)$-th precoding matrix of the corresponding precoding matrix group $r_1$, where $K_1$=mod($M_1$, $L_1$). When the cyclic delay processing is performed between subbands, in a case that the index of the subband where the resource element to which the x(i) is to be mapped is located is $L_2$, the codeword $W_1(i)$ is the $(K_2+1)$-th precoding matrix in the corresponding precoding matrix group $r_2$, where $K_2$=mod($M_2$, $L_2$); wherein, the $M_1$ and $M_2$ are quantities of the precoding matrices in the corresponding precoding matrix groups respectively, and the $r_1$ and $r_2$ are each a precoding matrix group number.

In addition, it should be noted that Mod (X, Y) herein refers to a modulo operation, that is, the operation to find the remainder of dividing an integer Y by another integer X in an integer operation. For example, Y=7, X=3, then Mod(X, Y)=1.

Referring to FIG. 5, an embodiment of the present disclosure further provides another uplink transmission method. The method is applied to a terminal, and includes a step 51.

Step 51, performing precoding processing of an uplink signal on multiple antenna ports by cyclically using codewords in a first candidate codeword set, and then transmitting the uplink signal.

Here, optionally, the uplink signal may be one or more of PUSCH, PUCCH, PUSCH DMRS, and PUCCH DMRS. Of course, the embodiment of the present disclosure is not limited to the above signals.

In the embodiment of the present disclosure, the terminal performs precoding processing of the uplink signal by cyclically using the codewords in the first candidate codeword set in the above step 51, such that transmit diversity gain may be introduced to improve the uplink transmission performance when the channel changes rapidly or the phase difference or power difference between the terminal antennas changes rapidly.

In the embodiment of the present disclosure, the terminal may specifically perform the following processing in the above step 51.

Assuming that the codewords in the first candidate codeword set have a dimension of P×P, the terminal can perform precoding processing of a data stream of the uplink signal by using following formula:

$$\begin{bmatrix} y^{(0)}(i) \\ M \\ y^{(P-1)}(i) \end{bmatrix} = D^{q_1}(i) W_0(i) \begin{bmatrix} x^{(0)}(i) \\ M \\ x^{(v-1)}(i) \end{bmatrix}$$

wherein, $x^{(u)}(i)$ represents a data symbol with an index i in a data stream with an index u of the uplink signal, v represents a quantity of data streams; $D^{q_1}(i)$ represents a codeword with an index $q_1$ in the first candidate codeword set; P represents a quantity of antenna ports configured for the terminal that correspond to the uplink signal; $W_0(i)$ represents a reference precoding matrix with a dimension of P×v; $y^{(p)}(i)$ represents a symbol mapped to an antenna port p and corresponding to x(i), and p represents an index of the antenna port; $x(i)=[x^{(0)}(i) \ldots x^{(v-1)}(i)]^T$.

For example, the first candidate codeword set may be a codeword set of part or all of the codewords in the uplink codebook that are used for the transmission of P streams over P ports. The terminal selects a codeword from the codewords in the first candidate codeword set as $D^{q_1}(i)$. Optionally, the first candidate codeword set includes all codewords in the uplink codebook that are used for the transmission of P streams over P ports. For the definition of the uplink codebook, a reference may be made to related standards.

For example, with two antenna ports, the first candidate codeword set B(n) is as follows:

| Index n | B(n) | | |
|---|---|---|---|
| 0~2 | $\frac{1}{\sqrt{2}}\begin{bmatrix} 1 & 0 \\ 0 & 1 \end{bmatrix}$ | $\frac{1}{2}\begin{bmatrix} 1 & 1 \\ 1 & -1 \end{bmatrix}$ | $\frac{1}{2}\begin{bmatrix} 1 & 1 \\ j & -j \end{bmatrix}$ |

For 4 antenna ports, a candidate set of D(i) is as follows:

| Index n | B(n) | | | |
|---|---|---|---|---|
| 0-3 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$ | $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ | $\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 4 | $\frac{1}{4}\begin{bmatrix} 1 & 1 & 1 & 1 \\ 1 & -1 & 1 & -1 \\ j & j & -j & -j \\ j & -j & -j & j \end{bmatrix}$ | — | — | — |

Alternatively, assuming that the codewords in the first candidate codeword set have a dimension of P×υ, the terminal can perform precoding processing of a data stream of the uplink signal by using following formula:

$$\begin{bmatrix} y^{(0)}(i) \\ M \\ y^{(P-1)}(i) \end{bmatrix} = W_1(i) \begin{bmatrix} x^{(0)}(i) \\ M \\ x^{(v-1)}(i) \end{bmatrix}$$

wherein, $x^{(u)}(i)$ represents the data symbol with the index i in the data stream with the index u of the uplink signal, v represents the quantity of data streams; P represents the quantity of antenna ports configured for the terminal that correspond to the uplink signal; $y^{(p)}(i)$ represents the symbol mapped to the antenna port p and corresponding to x(i), p represents the index of the antenna port; $W_1(i)$ represents a $(q_1+1)$-th codeword of an m-th candidate codeword set in a candidate precoding matrix set $W_1^s(i)$; $W_1^s(i)$ includes R candidate codeword sets, the first candidate codeword set is one of the R candidate codeword sets; wherein a q-th codeword $W_{q,s}$ in an r-th candidate codeword set satisfies $W_{q,s}=D^q W_r$; $D^q$ represents a q-th codeword in a second candidate codeword set formed by a square matrix with a dimension of P×P; $W_r$ represents a reference precoding matrix with a dimension of P×υ; $x(i)=[x^{(0)}(i) \ldots x^{(v-1)}(i)]^T$.

Here, the reference precoding matrix is a precoding matrix indicated by the base station to the terminal through a TPMI; or, the reference precoding matrix is a predefined precoding matrix; or, the reference precoding matrix is a precoding matrix selected from the uplink codebook.

Here, assuming that the scheduling bandwidth of the uplink signal includes a total of B subbands with indexes from 0 to B−1, B is an integer greater than or equal to 1, then the uplink signal may be precoded on multiple antenna ports within the subband by cyclically using the codewords in the first candidate codeword set. In a case that the index of the resource element to which the x(i) is to be mapped in the subband where the resource element is located is $L_1$, $q_1=\mathrm{mod}(M_2, L_1)$.

Alternatively, the uplink signal may be precoded on multiple antenna ports between the subbands by cyclically using the codewords in the first candidate codeword set. In a case that the index of the subband where the resource element to which the x(i) is to be mapped is located is $L_2$, $q_1=\mathrm{mod}(M_2, L_2)$; wherein, the $M_2$ is a quantity of codewords in the first candidate codeword set.

Multiple embodiments of the uplink transmission method on the terminal side are proposed above.

In the embodiments of the present disclosure, the terminal may receive the indication information sent for indicating that predetermined processing of the uplink signal is to be performed on multiple antenna ports, and the predetermined processing includes: performing delay processing of the uplink signal on multiple antenna ports during a precoding process, or performing precoding processing of the uplink signal on multiple antenna ports by cyclically using the codebooks in a candidate codebook set. Then, the terminal performs the related processing shown in FIG. 4 or FIG. 5 according to the above-mentioned indication information.

The solution in the embodiment of the present disclosure as shown in FIG. 4 or FIG. 5 can be applied, for example, in the following multiple scenarios:

1) The terminal is configured with codebook-based uplink signal transmission, and the coherent transmission capability of the terminal does not match the codeword or codebook subset restriction parameters configured by the base station.

Specifically, the first scenario described above may further includes:

the terminal is configured with codebook-based uplink signal transmission, and the terminal has partial-coherent transmission capability or non-coherent transmission capability;

or, the terminal is configured with codebook-based uplink signal transmission, and the terminal has non-coherent transmission capability, and the codeword corresponding to the TPMI indicated by the base station to the terminal is a partial-coherent transmission codeword or a full-coherent transmission codeword;

or, the terminal is configured with codebook-based uplink signal transmission, and the terminal has partial-coherent transmission capability, and the codeword corresponding to the TPMI indicated by the base station to the terminal is a full-coherent transmission codeword;

or, the terminal is configured with codebook-based uplink signal transmission, and the terminal is a terminal with partial-coherent transmission capability, and the codebook subset restriction parameter indicated by the base station to the terminal is full-coherent transmission;

or, the terminal is configured with codebook-based uplink signal transmission, and the terminal has non-coherent transmission capability, and the codebook subset restriction parameter indicated by the base station to the terminal is partial-coherent transmission or full-coherent transmission.

2) The terminal is configured with codebook-based uplink signal transmission, and the terminal is configured for single-stream transmission.

3) The terminal is configured with codebook-based uplink signal transmission, and the terminal is configured for single-stream transmission, and the coherent transmission capability of the terminal does not match the codeword or codebook subset restriction parameters configured by the base station.

Specifically, the third scenario mentioned above may further include: the terminal is configured with a codebook-based uplink signal transmission scheme, and the terminal has partial-coherent transmission capability or non-coherent transmission capability, and the base station instructs the terminal to perform single-stream transmission;

or, the terminal is configured with a codebook-based uplink signal transmission scheme, and the terminal has non-coherent transmission capability, and the codeword corresponding to the TPMI indicated by the base station to the terminal corresponds to single-stream transmission and is partial-coherent transmission codeword or full-coherent transmission codeword;

or, the terminal is configured to perform codebook-based uplink transmission, and the terminal has partial-coherent transmission capability, and the codebook subset restriction parameter indicated by the base station to the terminal indicates full-coherent transmission;

or, the terminal is configured with codebook-based uplink transmission, and the terminal has non-coherent transmission capability, the codebook subset restriction parameter indicated by the base station to the terminal is partial-oherent transmission or full-coherent transmission, and the base station instructs the terminal to perform single-stream transmission.

In the embodiment of the present disclosure, it is allowed that the base station indicate to the terminal codewords that exceed the terminal's coherent transmission capability, and/or the codebook subset restriction parameter indicated by the base station to the terminal exceeds the terminal's coherent transmission capability. Taking the 3GPP NR system as an example, the base station can indicate the codebook subset restriction to the UE through the higher-layer parameter codebookSubset in the RRC signaling, where the candidate values of the codebookSubset include: {fullyAndPartialAndNonCoherent, partialAndNonCoherent, nonCoherent}. Take the uplink codebook defined in the current version of the 3GPP TS38.211 protocol as an example. The codewords in the uplink codebook are divided into three categories, namely: full-coherent transmission, partial-coherent transmission and non-coherent transmission codewords. Any column in the codeword for partial-coherent transmission has only non-zero elements corresponding to the same coherent transmission antenna group (in the 3GPP NR system, the first and third antennas are of a coherent transmission antenna group, and the second and fourth antennas are of another coherent transmission antenna group); any column in the non-coherent transmission codeword has only a non-zero element corresponding to one antenna; in the full-coherent transmission codeword, at least one column of elements are non-zero.

For ease of understanding, the following table lists the uplink codebook in the 3GPP NR system, and provides the specific codeword types. According to the conventional 3GPP protocol, when the value of codebookSubset is fullyAndPartialAndNonCoherent, the TPMI indicated by the base station to the terminal can be any codeword in the codebook; when the value of codebookSubset is partialAndNonCoherent, the TPMI indicated by the base station to the terminal can only be the codeword for full-coherent transmission or partial-coherent transmission in the codebook; when the codebookSubset value is nonCoherent, the TPMI indicated by the base station to the terminal can only be the codeword for non-coherent transmission in the codebook. In the embodiment of the present disclosure, when the value of codebookSubset is partialAndNonCoherent, and the TPMI indicated by the base station to the terminal is the codeword for full-coherent transmission in the codebook, it is considered that the codeword indicated by the base station exceeds the codeword range corresponding to the value of the codebook subset restriction parameter; when the value of codebookSubset is nonCoherent, and the TPMI indicated by the base station to the terminal is the codeword for full-coherent transmission or partial-coherent transmission in the codebook, it is considered that the codeword indicated by the base station exceeds the codeword range corresponding to the value of the codebook subset restriction parameter. Similarly, when the coherent transmission capability reported by the terminal is non-coherent (the parameter pusch-TransCoherence is nonCoherent), if the TPMI indicated by the base station to the terminal is a codeword for full-coherent transmission or partial-coherent transmission in the codebook, it is considered that the codeword indicated by the base station exceeds the coherent transmission capability of the terminal (or the coherent transmission capability of the terminal does not match the codeword indicated by the base station); when the coherent transmission capability reported by the terminal is partial-coherent (parameter pusch-TransCoherence is partialNonCoherent), if the TPMI indicated by the terminal is the codeword for full-coherent transmission in the codebook, it is considered that the codeword indicated by the base station exceeds the coherent transmission capability of the terminal (or the coherent transmission capability of the terminal does not match the codeword indicated by the base station). When the coherent transmission capability reported by the terminal is non-coherent (the parameter pusch-TransCoherence is nonCoherent), if the value of the codebookSubset sent by the base station to the terminal is partialAndNonCoherent or fullyAndPartialAndNonCoherent, it is considered that the codebook subset restriction configured by the base station exceeds the coherent transmission capability of the terminal (or the coherent transmission capability of the terminal does not match the codebook subset restriction parameter configured by the base station); when the coherent transmission capability reported by the terminal is partial-coherent (the parameter pusch-TransCoherence is partialNonCoherent), if the value of codebookSubset configured by the base station for the terminal is fullyAndPartialAndNonCoherent, it is considered that the codebook subset restriction configured by the base station exceeds the coherent transmission capability of the terminal (or the coherent transmission capability of the terminal does not match the codebook subset restriction parameter configured by the base station).

For example, in the following table, codewords with a TPMI index of 0~1 are codewords for non-coherent transmission; the other codewords are codewords for partial-coherent transmission.

TABLE 6.3.1.5-1

Precoding matrix W for single-layer transmission using two antenna ports.

| TPMI index | W (ordered from left to right in increasing order of TPMI index) | | | | | | |
|---|---|---|---|---|---|---|---|
| 0-5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | — — |

For example, in the following table, codewords with a TPMI index of 0~-3 are codewords for non-coherent transmission; codewords with a TPMI index of 4~11 are codewords for partial-coherent transmission; other codewords are codewords for full-coherent transmission.

TABLE 6.3.1.5-2

Precoding matrix W for single-layer transmission using four antenna ports with transform precoding enabled.

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ — — — — |

For example, in the following table, codewords with a TPMI index of 0~3 are codewords for non-coherent transmission; codewords with a TPMI index of 4~11 are codewords for partial-coherent transmission; other codewords are codewords for full-coherent transmission.

TABLE 6.3.1.5-3

Precoding matrix W for single-layer transmission using four antenna ports with transform precoding disabled.

| TPMI index | W (ordered from left to right in increasing order of TPM index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |

TABLE 6.3.1.5-3-continued

Precoding matrix W for single-layer transmission using four antenna ports with transform precoding disabled.

| TPMI index | W (ordered from left to right in increasing order of TPM index) |
|---|---|
| 24-27 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$ — — — — |

For example, in the following table, codewords with a TPMI index of 0 are codewords for non-coherent transmission; codewords with a TPMI index of 1~2 are codewords for full-coherent transmission.

TABLE 6.3.1.5-4

Precoding matrix W for two-layer transmission using two antenna ports with transform precoding disabled.

| TPMI index | W (ordered from left to right in increasing order of TPMI index) |
|---|---|
| 0-2 | $\frac{1}{\sqrt{2}}\begin{bmatrix}1 & 0\\0 & 1\end{bmatrix}$ $\frac{1}{2}\begin{bmatrix}1 & 1\\1 & -1\end{bmatrix}$ $\frac{1}{2}\begin{bmatrix}1 & 1\\j & -j\end{bmatrix}$ |

For example, in the following table, codewords with a TPMI index of 0~5 are codewords for non-coherent transmission; codewords with a TPMI index of 6~13 are codewords for partial-coherent transmission; other codewords are codewords for full-coherent transmission.

TABLE 6.3.1.5-5

Precoding matrix W for two-layer transmission using four antenna ports with transform precoding disabled.

| TPMI index | W (ordered from left to right in increasing order of TPMI index) |
|---|---|
| 0-3 | $\frac{1}{2}\begin{bmatrix}1 & 0\\0 & 1\\0 & 0\\0 & 0\end{bmatrix}$ $\frac{1}{2}\begin{bmatrix}1 & 0\\0 & 0\\0 & 1\\0 & 0\end{bmatrix}$ $\frac{1}{2}\begin{bmatrix}1 & 0\\0 & 0\\0 & 0\\0 & 1\end{bmatrix}$ $\frac{1}{2}\begin{bmatrix}0 & 0\\1 & 0\\0 & 1\\0 & 0\end{bmatrix}$ |
| 4-7 | $\frac{1}{2}\begin{bmatrix}0 & 0\\1 & 0\\0 & 0\\0 & 1\end{bmatrix}$ $\frac{1}{2}\begin{bmatrix}0 & 0\\0 & 0\\1 & 0\\0 & 1\end{bmatrix}$ $\frac{1}{2}\begin{bmatrix}1 & 0\\0 & 1\\1 & 0\\0 & -j\end{bmatrix}$ $\frac{1}{2}\begin{bmatrix}1 & 0\\0 & 1\\1 & 0\\0 & j\end{bmatrix}$ |
| 8-11 | $\frac{1}{2}\begin{bmatrix}1 & 0\\0 & 1\\-j & 0\\0 & 1\end{bmatrix}$ $\frac{1}{2}\begin{bmatrix}1 & 0\\0 & 1\\-j & 0\\0 & -1\end{bmatrix}$ $\frac{1}{2}\begin{bmatrix}1 & 0\\0 & 1\\-1 & 0\\0 & -j\end{bmatrix}$ $\frac{1}{2}\begin{bmatrix}1 & 0\\0 & 1\\-1 & 0\\0 & j\end{bmatrix}$ |
| 12-15 | $\frac{1}{2}\begin{bmatrix}1 & 0\\0 & 1\\j & 0\\0 & 1\end{bmatrix}$ $\frac{1}{2}\begin{bmatrix}1 & 0\\0 & 1\\j & 0\\0 & -1\end{bmatrix}$ $\frac{1}{2\sqrt{2}}\begin{bmatrix}1 & 1\\1 & 1\\1 & -1\\1 & -1\end{bmatrix}$ $\frac{1}{2\sqrt{2}}\begin{bmatrix}1 & 1\\1 & 1\\j & -j\\j & -j\end{bmatrix}$ |

TABLE 6.3.1.5-5-continued

Precoding matrix W for two-layer transmission using four antenna ports with transform precoding disabled.

| TPMI index | W (ordered from left to right in increasing order of TPMI index) | | | |
|---|---|---|---|---|
| 16-19 | $\frac{1}{2\sqrt{2}}\begin{bmatrix} 1 & 1 \\ j & j \\ 1 & -1 \\ j & -j \end{bmatrix}$ | $\frac{1}{2\sqrt{2}}\begin{bmatrix} 1 & 1 \\ j & j \\ j & -j \\ -1 & 1 \end{bmatrix}$ | $\frac{1}{2\sqrt{2}}\begin{bmatrix} 1 & 1 \\ -1 & -1 \\ 1 & -1 \\ -1 & 1 \end{bmatrix}$ | $\frac{1}{2\sqrt{2}}\begin{bmatrix} 1 & 1 \\ -1 & -1 \\ j & -j \\ -j & j \end{bmatrix}$ |
| 20-21 | $\frac{1}{2\sqrt{2}}\begin{bmatrix} 1 & 1 \\ -j & -j \\ 1 & -1 \\ -j & j \end{bmatrix}$ | $\frac{1}{2\sqrt{2}}\begin{bmatrix} 1 & 1 \\ -j & -j \\ j & -j \\ 1 & -1 \end{bmatrix}$ | — | — |

For example, in the following table, codewords with a TPMI index of 0 are codewords for non-coherent transmission; codewords with a TPMI index of 1~2 are codewords for partial-coherent transmission; and other codewords are codewords for full-coherent transmission.

TABLE 6.3.1.5.4-6

Precoding matrix W for three-layer transmission using four antenna ports with transform precoding disabled.

| TPMI index | W (ordered from left to right in increasing order of TPMI index) | | | |
|---|---|---|---|---|
| 0-3 | $\frac{1}{2}\begin{bmatrix} 1 & 0 & 0 \\ 0 & 1 & 0 \\ 0 & 0 & 1 \\ 0 & 0 & 0 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4-6 | $\frac{1}{2\sqrt{3}}\begin{bmatrix} 1 & 1 & 1 \\ 1 & -1 & 1 \\ j & j & -j \\ j & -j & -j \end{bmatrix}$ | $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$ | $\frac{1}{2\sqrt{3}}\begin{bmatrix} 1 & 1 & 1 \\ -1 & 1 & -1 \\ j & j & -j \\ -j & j & j \end{bmatrix}$ | — |

For example, in the following table, codewords with a TPMI index of 0 are codewords for non-coherent transmission; codewords with a TPMI index of 1~2 are codewords for partial-coherent transmission; and other codewords are codewords for full-coherent transmission.

TABLE 6.3.1.5-7

Precoding matrix W for four-layer transmission using four antenna ports with transform precoding disabled.

| TPMI index | W (ordered from left to right in increasing order of TPMI index) | | | |
|---|---|---|---|---|
| 0-3 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$ | $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ | $\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 4 | $\frac{1}{4}\begin{bmatrix} 1 & 1 & 1 & 1 \\ 1 & -1 & 1 & -1 \\ j & j & -j & -j \\ j & -j & -j & j \end{bmatrix}$ | — | — | — |

The above describes the flow of the method on the terminal side according to the embodiments of the present disclosure. The following will further introduce the behavior of the base station side.

Referring to FIG. 6, an embodiment of the present disclosure provides an uplink transmission scheduling method. The method is applied to the base station side and includes a step 61.

Step 61: determining scheduling information of an uplink signal according to a transmission scheme of a terminal for the uplink signal;

wherein, the transmission scheme includes: performing the delay processing of the uplink signal on the multiple antenna ports, or performing the precoding processing of the uplink signal on the multiple antenna ports by cyclically using codebooks in a candidate codebook set.

Here, optionally, the uplink signal may be one or more of PUSCH, PUCCH, PUSCH DMRS, and PUCCH DMRS. Of course, the embodiment of the present disclosure is not limited to the above signals. The scheduling information of the uplink signal includes information such as MCS, transmit precoding matrix indicator (TPMI), a quantity of transmission layers, and corresponding SRS resource indication.

Here, the delay processing the uplink signal on multiple antenna ports in the precoding process is the uplink transmission scheme of the terminal shown in FIG. 4 above; the performing precoding processing of the uplink signal on multiple antenna ports by cyclically using codebooks in a candidate codebook set is the uplink transmission scheme of the terminal shown in FIG. 5 above.

Here, both the performing the delay processing of the uplink signal on the multiple antenna ports and the performing the precoding processing of the uplink signal on the multiple antenna ports by cyclically using the codebooks in the candidate codebook set can be realized in any one of the following ways:

The first way:
performing precoding processing of a data stream of the uplink signal by using following formula:

$$\begin{bmatrix} y^{(0)}(i) \\ M \\ y^{(P-1)}(i) \end{bmatrix} = D(i)W_0(i) \begin{bmatrix} x^{(0)}(i) \\ M \\ x^{(\upsilon-1)}(i) \end{bmatrix}$$

wherein, $x^{(u)}(i)$ represents a data symbol with an index i in a data stream with an index u of the uplink signal, v represents the quantity of data streams; D(i) represents the square matrix with a dimension of P×P that corresponds to x(i), P represents a quantity of antenna ports configured for the terminal that correspond to the uplink signal; $x(i)=[x^{(0)}(i) \ldots x^{(\upsilon-1)}(i)]^T$; $W_0(i)$ represents the reference precoding matrix with a dimension P×υ that corresponds to x(i), $x(i)=[x^{(0)}(i) \ldots x^{(\upsilon-1)}(i)]$; $y^{(p)}(i)$ represents the symbol mapped to the antenna port p and corresponding to x(i), p represents the index of the antenna port.

The second way:
performing precoding processing of a data stream of the uplink signal by using following formula:

$$\begin{bmatrix} y^{(0)}(i) \\ M \\ y^{(P-1)}(i) \end{bmatrix} = W_1(i) \begin{bmatrix} x^{(0)}(i) \\ M \\ x^{(\upsilon-1)}(i) \end{bmatrix}$$

wherein, $x^{(u)}(i)$ represents the data symbol with an index i in the data stream with an index u of the uplink signal; v represents the quantity of data streams; P represents a quantity of antenna ports configured for the terminal that correspond to the uplink signal; $x(i)=[x^{(0)}(i) \ldots x^{(\upsilon-1)}(i)]^T$; $W_1(i)$ represents a predetermined precoding matrix with a dimension of P×υ in a precoding matrix group in a candidate precoding matrix set $W_1^s(i)$; $y^{(p)}(i)$ represents a symbol mapped to the antenna port p and corresponding to x(i), and p represents an index of the antenna port; the candidate precoding matrix set $W_1^s(i)$ includes R precoding matrix groups, wherein the q-th precoding matrix $W_{q,s}$ in the r-th precoding matrix group satisfies $W_{q,s}=D^qW_r$; $D^q$ represents the q-th codeword in the first candidate codeword set formed by a square matrix with a dimension of P×P; $W_r$ represents a reference precoding matrix with a dimension of P×υ; v represents the quantity of data streams used to calculate the equivalent channel; P represents a quantity of antenna ports configured for the terminal that correspond to the uplink signal.

In the above step 61, determining scheduling information of an uplink signal according to a transmission scheme of a terminal for the uplink signal includes: acquiring an equivalent uplink channel by using a second formula, and determining the scheduling information of the uplink signal by using the equivalent uplink channel.

Here, the second formula is:

$$H(i)'=D(i)W(i)H(i);$$

wherein H(i) is an uplink channel estimation value which corresponds to a resource element with an index i and is acquired by the base station according to a reference signal for uplink channel state information (CSI) acquisition, H(i)' is an equivalent channel of an uplink channel which corresponds to a resource element with an index i and is acquired by the base station according to the reference signal for uplink CSI acquisition; D(i) is a square matrix with a dimension of P×P that corresponds to the resource element with the index i, P represents a quantity of antenna ports configured for the terminal that correspond to the uplink signal; W(i) is a reference precoding matrix used by the base station to calculate the equivalent channel corresponding to the resource element with the index i, all resource elements in a same subband correspond to a same D(i), and there is a predetermined rule between a value of D(i) and a number or frequency of the subband, or the value of D(i) is determined according to a frequency domain position of the resource element with the index i in the subband.

Alternatively, the second formula is:

$$H(i)'=W_1(i)H(i)$$

wherein H(i) is the uplink channel estimation value which corresponds to a resource element with an index i and is acquired by the base station according to the reference signal for uplink CSI acquisition, H(i)' is the equivalent channel of the uplink channel which corresponds to a resource element with an index i and is acquired by the base station according to the reference signal for uplink CSI acquisition; $W_1(i)$ represents a precoding matrix $W_1$ in the codeword set $W_1^s(i)$ that corresponds to the resource element i; $W_1^s(i)$ is dividable into K codeword groups, wherein a q-th codeword in a k-th codeword group satisfies $W_{q,s}=D^qW_k$; $D^q$ represents a q-th codeword in a second candidate codeword set formed by a square matrix with a dimension of P×P; $W_k$ represents a reference precoding matrix with a dimension of P×υ; the base station determines $W_1$ of each resource element by cyclically using codewords in the first candidate codeword set, the first candidate codeword set is a codeword group in $W_1^s(i)$.

Furthermore, the base station may also adopt a scheme corresponding to the precoding scheme of the terminal for the uplink signal to detect the uplink signal. Specifically, the base station may acquire an equivalent uplink channel by using a second formula, and detect the uplink signal by using the equivalent uplink channel.

Here, the second formula is:

$$H(i)'=D(i)W(i)H(i);$$

wherein H(i) is an uplink channel estimation value which corresponds to a resource element with an index i and is acquired by the base station according to a reference signal for uplink CSI acquisition, H(i)' is an equivalent channel of an uplink channel which corresponds to a resource element with an index i and is acquired by the base station according to the reference signal for uplink CSI acquisition; D(i) is a square matrix with a dimension of P×P that corresponds to the resource element with the index i, P represents a quantity of antenna ports configured for the terminal that correspond to the uplink signal; W(i) is a reference precoding matrix used by the base station to calculate the equivalent channel corresponding to the resource element with the index i, all resource elements in a same subband correspond to a same D(i), and there is a predetermined rule between a value of D(i) and a number or frequency of the subband, or the value of D(i) is determined according to a frequency domain position of the resource element with the index i in the subband.

Alternatively, the second formula is:

$$H(i)'=W_1(i)H(i)$$

wherein H(i) is the uplink channel estimation value which corresponds to a resource element with an index i and is acquired by the base station according to the reference signal for uplink CSI acquisition, H(i)' is the equivalent channel of the uplink channel which corresponds to a resource element with an index i and is acquired by the base station according to the reference signal for uplink CSI acquisition; $W_1(i)$ represents a precoding matrix $W_1$ in the codeword set $W_1^s(i)$ that corresponds to the resource element i; $W_1^s(i)$ is dividable into K codeword groups, wherein a q-th codeword in a k-th codeword group satisfies $W_{q,s}=D^q W_k$; $D^q$ represents a q-th codeword in a second candidate codeword set formed by a square matrix with a dimension of P×P; $W_k$ represents a reference precoding matrix with a dimension of P×υ; the base station determines $W_1$ of each resource element by cyclically using codewords in the first candidate codeword set, the first candidate codeword set is a codeword group in $W_1^s(i)$.

In addition, in the embodiment of the present disclosure, the base station may also send an indication message for determining D(i) to the terminal, so that the terminal determines D(i) according to the indication message.

Here, the value of the element $d(i)_{l,m}$ in the l-th row and m-th column of the D(i) or $D^q$ may be determined in the following manner:

$$d(i)_{l,m} = \begin{cases} 0, & l \neq m \\ e^{-j(l-1)\theta_1 n_1/P}, & l = m \end{cases};$$

or, in a case that the terminal has a non-coherent transmission capability, $$d(i)_{l,m} = \begin{cases} 0, & l \neq m \\ e^{-j(l-1)\theta_2 n_1/P}, & l = m \end{cases};$$

in a case that the terminal has a full-coherent transmission capability, $$d(i)_{l,m} = \begin{cases} 0, & l \neq m \\ 1, & l = m \end{cases};$$

in a case that the terminal has a partial-coherent transmission capability, $$d(i)_{l,m} = \begin{cases} 0, & l \neq m \\ e^{-j a_z \theta_3 n_1/P}, & l = m \end{cases};$$

wherein $a_z$ is the coefficient corresponding to the z-th coherent transmission antenna group; each of the $\theta_1$, $\theta_2$ and $\theta_3$ is a predetermined angle value; $n_1$ is an integer greater than 0.

The value of the $\theta_1$, $\theta_2$ or $\theta_3$ is determined according to a pre-agreed first angle threshold, and is not greater than the first angle threshold; or, the value of the $\theta_1$, $\theta_2$ or $\theta_3$ is determined according to a sent second angle threshold, and is not greater than the second angle threshold, and the method further includes: sending the second angle threshold to the terminal; or, the value of the $\theta_1$, $\theta_2$ or $\theta_3$ is a value stipulated in a protocol; or the value of the $\theta_1$, $\theta_2$ or $\theta_3$ has a correspondence with the scheduling bandwidth of the uplink signal; or the value of the $\theta_1$, $\theta_2$ or $\theta_3$ has a correspondence with the subband bandwidth in the scheduling bandwidth of the uplink signal; or, the base station may further indicate the value of the $\theta_1$, $\theta_2$ or $\theta_3$ to the terminal through signaling.

Optionally, the W(i) or $W_1(i)$ is a precoding matrix indicated by the base station to the terminal through a TPMI; or, the W(i) or $W_1(i)$ is a predefined precoding matrix.

Optionally, in the embodiment of the present disclosure, the base station may also send to the terminal indication information for indicating that predetermined processing of the uplink signal is to be performed on multiple antenna ports, and the predetermined processing includes performing delay processing of the uplink signals on multiple antenna ports during a precoding process or performing precoding processing of the uplink signal on multiple antenna ports by cyclically using codebooks in a candidate codebook set.

In addition, it should be noted that, in the embodiment of the present disclosure, the codewords in the uplink codebook may be divided into three types: full-coherent transmission, partial-coherent transmission and non-coherent transmission codewords. Any column in the codeword for partial-coherent transmission has only non-zero elements corresponding to the same coherent transmission antenna group (in the 3GPP NR system, the first and third antennas are of a coherent transmission antenna group, and the second and fourth antennas are of another coherent transmission antenna group); any column in the non-coherent transmission codeword has only a non-zero element corresponding to one antenna; in the full-coherent transmission codeword, at least one column of elements are non-zero.

The relevant methods according to the embodiments of the present disclosure are described above from the terminal side and the base station side respectively. The above methods will be further explained by means of more detailed examples below. It should be noted that the above description mainly uses PUSCH as an example to describe uplink signals. It should be understood that the methods in the embodiments of the present disclosure are also applicable to uplink signals such as PUCCH, PUSCH DMRS, PUCCH DMRS, and SRS.

Based on the above methods, embodiments of the present disclosure further provide devices for implementing the above methods.

Figure 7:
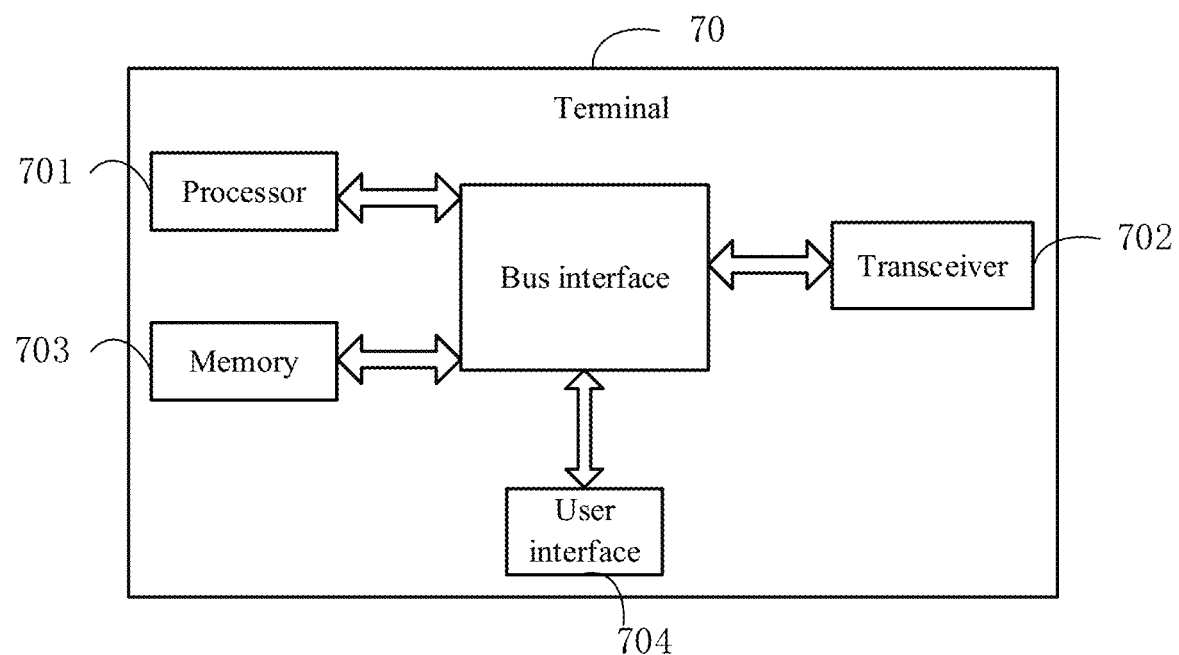
FIG. 7 is a schematic structural diagram of a terminal provided by an embodiment of the present disclosure.

Referring to FIG. 7, FIG. 7 is a schematic structural diagram of a terminal provided by an embodiment of the present disclosure. The terminal 70 includes a processor 701, a transceiver 702, a memory 703, a user interface 704, and a bus interface.

In the embodiment of the present disclosure, the terminal 70 further includes: a computer program stored in the memory 703 and executable by the processor 701.

The processor 701 is configured to read the computer program in the memory to implement the following process: performing delay processing of an uplink signal on multiple antenna ports;

The transceiver 702 is configured to transmit the delay-processed uplink signal.

In FIG. 7, a bus architecture may include any number of interconnected buses and bridges, and connects various circuits including one or more processors specifically represented by the processor 701 and memory represented by the memory 703. The bus architecture may also connect various other circuits such as peripherals, voltage regulators and power management circuits, which is well known in the art. Therefore, a detailed description thereof is omitted herein. A bus interface provides an interface. The transceiver 702 may include a plurality of elements, that is, a transmitter and a receiver, to provide a unit for communication with various other apparatuses on a transmission medium. For different user equipment, the user interface 704 may also be an interface capable of connecting externally or internally a required device, and the connected device includes, but is not limited to: a keypad, a display, a speaker, a microphone, a joystick, and the like.

The processor 701 is responsible for supervising the bus architecture and normal operation and the memory 703 may store the data being used by the processor 701 during operation.

Optionally, the processor 701 is further configured to perform precoding processing of a data stream of the uplink signal by using following formula:

$$\begin{bmatrix} y^{(0)}(i) \\ M \\ y^{(P-1)}(i) \end{bmatrix} = D(i)W_0(i) \begin{bmatrix} x^{(0)}(i) \\ M \\ x^{(\upsilon-1)}(i) \end{bmatrix}$$

wherein, $x^{(u)}(i)$ represents a data symbol with an index i in a data stream with an index u of the uplink signal, v represents a quantity of data streams; $D(i)$ represents a square matrix with a dimension of P×P that corresponds to $x(i)$, P represents a quantity of antenna ports configured for the terminal that correspond to the uplink signal; $x(i)$ [ $x^{(0)}(i) \ldots x^{(\upsilon-1)}(i)]^T$; $W_0(i)$ represents a reference precoding matrix with a dimension of P×υ that corresponds to $x(i)$; $y^{(p)}(i)$ represents a symbol mapped to an antenna port p and corresponding to $x(i)$, p represents an index of the antenna port.

Optionally, the $D(i)$ is a square matrix related to the coherent transmission capability of the terminal; or, the $D(i)$ is a diagonal matrix, and elements on a main diagonal correspond to different phase offsets respectively; or, in a case that the terminal has a non-coherent transmission capability, the $D(i)$ is a diagonal matrix, and elements on a main diagonal correspond to different phase offsets respectively; in a case that the terminal has a full-coherent transmission capability, the $D(i)$ is an identity matrix; in a case that the terminal has a partial-coherent transmission capability, the $D(i)$ is a diagonal matrix, and elements corresponding to a same coherent transmission antenna group have a same phase offset, the elements corresponding to different coherent transmission antenna groups have different phase offsets.

Optionally, the value of the element $d(i)_{l,m}$ in the l-th row and m-th column of the $D(i)$ may be determined in the following manner:

$$d(i)_{l,m} = \begin{cases} 0, & l \neq m \\ e^{-j(l-1)\theta_1 n_1/P}, & l = m \end{cases};$$

or, in a case that the terminal has a non-coherent transmission capability, $$d(i)_{l,m} = \begin{cases} 0, & l \neq m \\ e^{-j(l-1)\theta_2 n_1/P}, & l = m \end{cases};$$

in a case that the terminal has a full-coherent transmission capability, $$d(i)_{l,m} = \begin{cases} 0, & l \neq m \\ 1, & l = m \end{cases};$$

in a case that the terminal has a partial-coherent transmission capability, $$d(i)_{l,m} = \begin{cases} 0, & l \neq m \\ e^{-ja_z\theta_3 n_1/P}, & l = m \end{cases};$$

wherein $a_z$ is the coefficient corresponding to the z-th coherent transmission antenna group; each of the $\theta_1$, $\theta_2$ and $\theta_3$ is a predetermined angle value; $n_1$ is an integer greater than 0.

Optionally, the scheduling bandwidth of the uplink signal includes B subbands, where B is an integer greater than or equal to 1;

each $x(i)$ mapped to the same subband corresponds to the same $D(i)$, and there is a predetermined rule between the value of $D(i)$ and the number or frequency of the subband; or the value of D(i) corresponding to each x(i) mapped to the same subband is determined according to the frequency domain position of the resource element corresponding to the x(i) in the subband.

Optionally, the transceiver 702 is further configured to receive an indication message sent by the base station for determining the D(i);

the processor 701 is further configured to determine the D(i) according to the indication message.

Optionally, the scheduling bandwidth of the uplink signal includes B subbands, where B is an integer greater than or equal to 1;

in D(i) corresponding to each x(i) mapped to the same subband, the value of $n_1$ is the same, and the value of $n_1$ increases or decreases with increasing frequencies corresponding to the subbands; or in D(i) corresponding to each x(i) mapped to the same subband, the value of $n_1$ is determined according to the frequency domain position of the resource element corresponding to x(i) in the subband, and the value of $n_1$ increases or decreases as the frequency of the resource element corresponding to x(i) increases.

Optionally, the scheduling bandwidth of the uplink signal includes B subbands, where B is an integer greater than or equal to 1;

the subbands are numbered from 1 to B in a frequency-increasing manner, and $n_1$ is equal to a number of a subband where a resource element to which x(i) is to be mapped is located, or resource elements occupied by data symbols are numbered from 1 in a frequency-increasing manner in one of the subbands, and $n_1$ is equal to a number of a data symbol of the x(i) in the subband.

Optionally, the processor 701 is further configured to perform precoding processing of a data stream of the uplink signal by using following formula:

$$\begin{bmatrix} y^{(0)}(i) \\ M \\ y^{(P-1)}(i) \end{bmatrix} = W_1(i) \begin{bmatrix} x^{(0)}(i) \\ M \\ x^{(\upsilon-1)}(i) \end{bmatrix}$$

wherein, $x^{(u)}(i)$ represents a data symbol with an index i in a data stream with an index u of the uplink signal; $\upsilon$ represents a quantity of data streams; P represents a quantity of antenna ports configured for the terminal that correspond to the uplink signal; $x(i) [x^{(0)}(i) \ldots x^{(\upsilon-1)}(i)]^T$; $W_1(i)$ represents a predetermined precoding matrix with a dimension of P×υ in a precoding matrix group in a candidate precoding matrix set $W_1{}^s(i)$; $y^{(p)}(i)$ represents a symbol mapped to an antenna port p and corresponding to x(i), and p represents an index of the antenna port;

the candidate precoding matrix set $W_1{}^s(i)$ includes R precoding matrix groups, wherein a q-th precoding matrix $W_{q,s}$ in an r-th precoding matrix group satisfies $W_{q,s}=D^qW_r$; $D^q$ represents a q-th codeword in a first candidate codeword set formed by a square matrix with a dimension of P×P; $W_r$ represents a reference precoding matrix with a dimension of P×υ.

Optionally, the scheduling bandwidth of the uplink signal includes B subbands, where B is an integer greater than or equal to 1;

the $W_1(i)$ corresponding to each x(i) mapped to the same subband is the same, and there is a predetermined rule between the value of $W_1(i)$ and the number or frequency of the subband; or, the value of $W_1(i)$ corresponding to each x(i) mapped to the same subband is determined according to the frequency domain position of the resource element corresponding to the x(i) in the subband.

Optionally, the transceiver 702 is further configured to receive an indication message sent by the base station for determining the $D^q$, and the processor 701 is further configured to determine the $D^q$ according to the indication message.

Optionally, any codeword $D^q$ in the first candidate codeword set is a diagonal matrix, and elements on a main diagonal correspond to different phase offsets respectively.

or, in a case that the terminal has a non-coherent transmission capability, any codeword D in the first candidate codeword set is a diagonal matrix, and elements on a main diagonal correspond to different phase offsets respectively; in a case that the terminal has a full-coherent transmission capability, any codeword D in the first candidate codeword set is an identity matrix; in a case that the terminal has a partial-coherent transmission capability, any codeword $D^q$ in the first candidate codeword set is a diagonal matrix, and elements corresponding to a same coherent transmission antenna group have a same phase offset, elements corresponding to different coherent transmission antenna groups have different phase offsets.

Optionally, the value of the element $d_{l,m}$ in the l-th row and m-th column of the $D^q$ is determined in the following manner:

$$d_{l,m} = \begin{cases} 0, & l \neq m \\ e^{-j(l-1)\theta_1 n_2/P}, & l = m \end{cases};$$

in a case that the terminal has a non-coherent transmission capability, $$d_{l,m} = \begin{cases} 0, & l \neq m \\ e^{-j(l-1)\theta_2 n_2/P}, & l = m \end{cases};$$

in a case that the terminal has a full-coherent transmission capability, $$d_{l,m} = \begin{cases} 0, & l \neq m \\ 1, & l = m \end{cases};$$

in a case that the terminal has a partial-coherent transmission capability, $$d_{l,m} = \begin{cases} 0, & l \neq m \\ e^{-ja_z\theta_3 n_2/P}, & l = m \end{cases};$$

wherein, $a_z$ is the coefficient corresponding to the z-th coherent transmission antenna group; each of the $\theta_1$, $\theta_2$ and $\theta_3$ is a predetermined angle value; the value of $n_2$ ranges from 1 to M, where M is an integer greater than 1.

Optionally, the scheduling bandwidth of the uplink signal includes B subbands, where B is an integer greater than or equal to 1;

all data symbols mapped to the same subband correspond to the same $n_2$, the value of $n_2$ increases or decreases with increasing frequencies corresponding to the subbands;

the value of $n_2$ is determined according to the frequency domain position of the resource element corresponding to the data symbol $x^{(j)}(i)$ in the subband where the resource element is located, and the value of $n_2$ increases or decreases as the frequency of the resource element corresponding to the data symbol increases.

Optionally, the scheduling bandwidth of the uplink signal includes a total of B subbands with indexes from 0 to B−1, where B is an integer greater than or equal to 1;

in a case that an index of a time-frequency resource to which the x(i) is to be mapped in a subband where the time-frequency resource is located is $L_1$, the codeword $W_1(i)$ is a ($K_1$+1)-th precoding matrix in a corresponding precoding matrix group $r_1$, wherein $K_1$=mod($M_1$, $L_1$); or, in a case that an index of a subband where a resource element to which the x(i) is to be mapped is located is $L_2$, the codeword $W_1(i)$ is a ($K_2$+1)-th precoding matrix in a corresponding precoding matrix group $r_2$, wherein $K_2$=mod ($M_2$, $L_2$);

wherein, the $M_1$ and $M_2$ are quantities of the precoding matrices in the corresponding precoding matrix groups respectively, and the $r_1$ and $r_2$ are each a precoding matrix group number.

Optionally, the value of the $\theta_1$, $\theta_2$ or $\theta_3$ is determined by the terminal itself, or, the value of the $\theta_1$, $\theta_2$ or $\theta_3$ is determined by the terminal according to a pre-agreed first angle threshold, and is not greater than the first angle threshold; or, the value of the $\theta_1$, $\theta_2$ or $\theta_3$ is determined by the terminal according to a second angle threshold sent by a base station, and is not greater than the second angle threshold; or, the value of the $\theta_1$, $\theta_2$ or $\theta_3$ is a value stipulated in protocol; or, the value of the $\theta_1$, $\theta_2$ or $\theta_3$ is a value determined according to the scheduling bandwidth of the uplink signal; or, the value of the $\theta_1$, $\theta_2$ or $\theta_3$ is a value determined according to the subband bandwidth in the scheduling bandwidth of the uplink signal; or, the value of the $\theta_1$, $\theta_2$ or $\theta_3$ is indicated to the terminal by the base station through signaling.

Optionally, the reference precoding matrix is a precoding matrix indicated by the base station to the terminal through a TPMI; or, the reference precoding matrix is a predefined precoding matrix; or, the reference precoding matrix is a precoding matrix selected from the uplink codebook.

Optionally, the uplink signal is one or more of PUSCH, PUCCH, DMRS of PUSCH, and DMRS of PUCCH.

Optionally, the terminal is configured with codebook-based uplink signal transmission, and the coherent transmission capability of the terminal does not match the codeword or codebook subset restriction parameters configured by the base station;

or, the terminal is configured with codebook-based uplink signal transmission, and the terminal is configured for single-stream transmission;

or, the terminal is configured with codebook-based uplink signal transmission, and the terminal is configured for single-stream transmission, and the coherent transmission capability of the terminal does not match the codeword or codebook subset restriction parameters configured by the base station.

Optionally, the transceiver 702 is further configured to receive the indication information sent by a base station for indicating that predetermined processing of the uplink signal is to be performed on multiple antenna ports, wherein the predetermined processing includes: performing delay processing of the uplink signal on multiple antenna ports during a precoding process, or performing precoding processing of the uplink signal on multiple antenna ports by cyclically using codebooks in a candidate codebook set.

Figure 8:
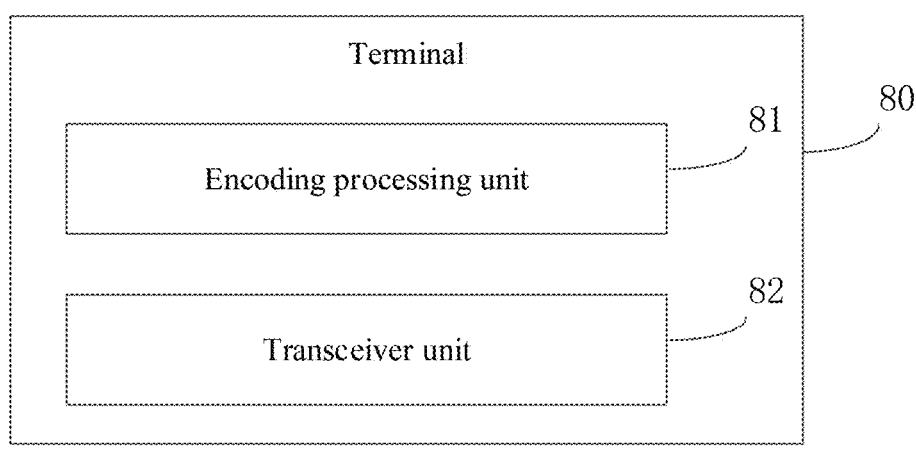
FIG. 8 is another schematic structural diagram of a terminal provided by an embodiment of the present disclosure.

Referring to FIG. 8, an embodiment of the present disclosure further provides another terminal 80, including:

an encoding processing unit 81, configured to perform delay processing of an uplink signal on multiple antenna ports;

a transceiver unit 82, configured to transmit the delay-processed uplink signal.

Optionally, the encoding processing unit 81 is further configured to perform precoding processing of a data stream of the uplink signal by using following formula:

$$\begin{bmatrix} y^{(0)}(i) \\ M \\ y^{(P-1)}(i) \end{bmatrix} = D(i)W_0(i) \begin{bmatrix} x^{(0)}(i) \\ M \\ x^{(v-1)}(i) \end{bmatrix}$$

wherein, $x^{(u)}(i)$ represents a data symbol with an index i in a data stream with an index u of the uplink signal, v represents a quantity of data streams; D(i) represents a square matrix with a dimension of P×P that corresponds to x(i), P represents a quantity of antenna ports configured for the terminal that correspond to the uplink signal; $x(i)=[x^{(0)}(i) \ldots x^{(v-1)}(i)]^T$; $W_0(i)$ represents a reference precoding matrix with a dimension of P×v that corresponds to x(i); $y^{(p)}(i)$ represents a symbol mapped to an antenna port p and corresponding to x(i), p represents an index of the antenna port.

Optionally, the D(i) is a square matrix related to the coherent transmission capability of the terminal; or, the D(i) is a diagonal matrix, and elements on a main diagonal correspond to different phase offsets respectively; or, in a case that the terminal has a non-coherent transmission capability, the D(i) is a diagonal matrix, and elements on a main diagonal correspond to different phase offsets respectively; in a case that the terminal has a full-coherent transmission capability, the D(i) is an identity matrix; in a case that the terminal has a partial-coherent transmission capability, the D(i) is a diagonal matrix, and elements corresponding to a same coherent transmission antenna group have a same phase offset, elements corresponding to different coherent transmission antenna groups have different phase offsets.

Optionally, the value of the element $d(i)_{l,m}$ in the l-th row and m-th column of the D(i) may be determined in the following manner:

$$d(i)_{l,m} = \begin{cases} 0, & l \neq m \\ e^{-j(l-1)\theta_1 n_1/P}, & l = m \end{cases};$$

or, in a case that the terminal has a non-coherent transmission capability, $$d(i)_{l,m} = \begin{cases} 0, & l \neq m \\ e^{-j(l-1)\theta_2 n_1/P}, & l = m \end{cases};$$

in a case that the terminal has a full-coherent transmission capability, $$d(i)_{l,m} = \begin{cases} 0, & l \neq m \\ 1, & l = m \end{cases};$$

in a case that the terminal has a partial-coherent transmission capability, $$d(i)_{l,m} = \begin{cases} 0, & l \neq m \\ e^{-ja_z\theta_3 n_1/P}, & l = m \end{cases};$$

wherein $a_z$ is the coefficient corresponding to the z-th coherent transmission antenna group; each of the $\theta_1$, $\theta_2$ and $\theta_3$ is a predetermined angle value; $n_1$ is an integer greater than 0.

Optionally, the scheduling bandwidth of the uplink signal includes B subbands, where B is an integer greater than or equal to 1;

each x(i) mapped to the same subband corresponds to the same D(i), and there is a predetermined rule between the value of D(i) and the number or frequency of the subband; or, the value of D(i) corresponding to each x(i) mapped to the same subband is determined according to the frequency domain position of the resource element corresponding to the x(i) in the subband.

Optionally, the transceiver unit 82 is further configured to receive an indication message sent by the base station for determining the D(i);

the encoding processing unit 81 is further configured to determine the D(i) according to the indication message.

Optionally, the scheduling bandwidth of the uplink signal includes B subbands, where B is an integer greater than or equal to 1;

in D(i) corresponding to each x(i) mapped to the same subband, the value of $n_1$ is the same, and the value of $n_1$ increases or decreases with increasing frequencies corresponding to the subbands; or in D(i) corresponding to each x(i) mapped to the same subband, the value of $n_1$ is determined according to the frequency domain position of the resource element corresponding to x(i) in the subband, and the value of $n_1$ increases or decreases as the frequency of the resource element corresponding to x(i) increases.

Optionally, the scheduling bandwidth of the uplink signal includes B subbands, where B is an integer greater than or equal to 1;

the subbands are numbered from 1 to B in a frequency-increasing manner, and $n_1$ is equal to a number of a subband where a resource element to which x(i) is to be mapped is located, or resource elements occupied by the data symbols are numbered from 1 in a frequency-increasing manner in one of the subbands, and $n_1$ is equal to the number of the data symbol of the x(i) in the subband.

Optionally, the encoding processing unit 81 is further configured to perform precoding processing of a data stream of the uplink signal by using following formula:

$$\begin{bmatrix} y^{(0)}(i) \\ M \\ y^{(P-1)}(i) \end{bmatrix} = W_1(i) \begin{bmatrix} x^{(0)}(i) \\ M \\ x^{(v-1)}(i) \end{bmatrix}$$

wherein, $x^{(u)}(i)$ represents a data symbol with an index i in a data stream with an index u of the uplink signal; v represents a quantity of data streams; P represents a quantity of antenna ports configured for the terminal that correspond to the uplink signal; $x(i)=[x^{(0)}(i) \ldots x^{(v-1)}(i)]^T$; $W_1(i)$ represents a predetermined precoding matrix with a dimension of P×υ in a precoding matrix group in a candidate precoding matrix set $W_1^s(i)$; $y^{(p)}(i)$ represents a symbol mapped to an antenna port p and corresponding to x(i), and p represents an index of the antenna port;

the candidate precoding matrix set $W_1^s(i)$ includes R precoding matrix groups, wherein a q-th precoding matrix $W_{q,s}$ in an r-th precoding matrix group satisfies $W_{q,s}=D^qW_r$; $D^q$ represents a q-th codeword in a first candidate codeword set formed by a square matrix with a dimension of P×P; $W_r$ represents a reference precoding matrix with a dimension of P×υ.

Optionally, the scheduling bandwidth of the uplink signal includes B subbands, where B is an integer greater than or equal to 1;

the $W_1(i)$ corresponding to each x(i) mapped to the same subband is the same, and there is a predetermined rule between the value of $W_1(i)$ and the number or frequency of the subband; or, the value of $W_1(i)$ corresponding to each x(i) mapped to the same subband is determined according to the frequency domain position of the resource element corresponding to the x(i) in the subband.

Optionally, the transceiver unit 82 is further configured to receive an indication message sent by the base station for determining the $D^q$, and the encoding processing unit 81 is further configured to determine the $D^q$ according to the indication message.

Optionally, any codeword $D^q$ in the first candidate codeword set is a diagonal matrix, and elements on a main diagonal correspond to different phase offsets respectively; or, in a case that the terminal has a non-coherent transmission capability, any codeword D in the first candidate codeword set is a diagonal matrix, and elements on a main diagonal correspond to different phase offsets respectively; in a case that the terminal has a full-coherent transmission capability, any codeword D in the first candidate codeword set is an identity matrix; in a case that the terminal has a partial-coherent transmission capability, any codeword $D^q$ in the first candidate codeword set is a diagonal matrix, and elements corresponding to a same coherent transmission antenna group have a same phase offset, elements corresponding to different coherent transmission antenna groups have different phase offsets.

Optionally, the value of the element $d_{l,m}$ in the l-th row and m-th column of the $D^q$ may be determined in the following manner:

$$d_{l,m} = \begin{cases} 0, & l \neq m \\ e^{-j(l-1)\theta_1 n_2/P}, & l = m \end{cases};$$

or, in a case that the terminal has a non-coherent transmission capability, $$d_{l,m} = \begin{cases} 0, & l \neq m \\ e^{-j(l-1)\theta_2 n_2/P}, & l = m \end{cases};$$

in a case that the terminal has a full-coherent transmission capability, $$d_{l,m} = \begin{cases} 0, & l \neq m \\ 1, & l = m \end{cases};$$

in a case that the terminal has a partial-coherent transmission capability, $$d_{l,m} = \begin{cases} 0, & l \neq m \\ e^{-j a_z \theta_3 n_2/P}, & l = m \end{cases};$$

wherein, $a_z$ is the coefficient corresponding to the z-th coherent transmission antenna group; each of the $\theta_1$, $\theta_2$ and $\theta_3$ is a predetermined angle value; the value of $n_2$ ranges from 1 to M, where M is an integer greater than 1.

Optionally, the scheduling bandwidth of the uplink signal includes B subbands, where B is an integer greater than or equal to 1;

all data symbols mapped to the same subband correspond to the same $n_2$, the value of $n_2$ increases or decreases with increasing frequencies corresponding to the subbands; or, the value of $n_2$ is determined according to the frequency domain position of the resource element corresponding to the data symbol $x^{(j)}(i)$ in the subband where the resource element is located, and the value of $n_2$ increases or decreases as the frequency of the resource element corresponding to the data symbol increases.

Optionally, the scheduling bandwidth of the uplink signal includes a total of B subbands with indexes from 0 to B−1, where B is an integer greater than or equal to 1;

in a case that an index of a time-frequency resource to which the x(i) is to be mapped in a subband where the time-frequency resource is located is $L_1$, the codeword $W_1(i)$ is a $(K_1+1)$-th precoding matrix in a corresponding precoding matrix group $r_1$, wherein $K_1 = \mathrm{mod}(M_1, L_1)$; or, in a case that an index of a subband where a resource element to which the x(i) is to be mapped is located is $L_2$, the codeword $W_1(i)$ is a $(K_2+1)$-th precoding matrix in a corresponding precoding matrix group $r_2$, wherein $K_2 = \mathrm{mod}(M_2, L_2)$;

wherein, the $M_1$ and $M_2$ are quantities of the precoding matrices in the corresponding precoding matrix groups respectively, and the $r_1$ and $r_2$ are each a precoding matrix group number.

An embodiment of the present disclosure further provides another terminal, the structure of which is similar to that of the terminal shown in FIG. 7. The terminal includes: a processor, a transceiver, a memory, a user interface, and a bus interface.

In the embodiment of the present disclosure, the terminal further includes: a computer program stored in the memory and executable by the processor.

The processor is configured to read the computer program in the memory to implement the following process: perform precoding processing of an uplink signal on multiple antenna ports by cyclically using codewords in a first candidate codeword set;

the transceiver is configured to transmit the precoding-processed uplink signal.

In this terminal, a bus architecture may include any number of interconnected buses and bridges, and connects various circuits including one or more processors specifically represented by the processor and memory represented by the memory. The bus architecture may also connect various other circuits such as peripherals, voltage regulators and power management circuits, which is well known in the art. Therefore, a detailed description thereof is omitted herein. A bus interface provides an interface. The transceiver may include a plurality of elements, that is, a transmitter and a receiver, to provide a unit for communication with various other apparatuses on a transmission medium. For different user equipment, the user interface may also be an interface capable of connecting externally or internally a required device, and the connected device includes, but is not limited to: a keypad, a display, a speaker, a microphone, a joystick, and the like.

The processor is responsible for supervising the bus architecture and normal operation and the memory may store the data being used by the processor during operation.

Optionally, in a case that the codewords in the first candidate codeword set have a dimension of P×P, the processor is further configured to:

perform precoding processing of a data stream of the uplink signal by using following formula:

$$\begin{bmatrix} y^{(0)}(i) \\ M \\ y^{(P-1)}(i) \end{bmatrix} = D^{q_1}(i) W_0(i) \begin{bmatrix} x^{(0)}(i) \\ M \\ x^{(v-1)}(i) \end{bmatrix}$$

wherein, $x^{(u)}(i)$ represents a data symbol with an index i in a data stream with an index u of the uplink signal, v represents a quantity of data streams; $D^{q_1}(i)$ represents a codeword with an index $q_1$ in the first candidate codeword set; P represents a quantity of antenna ports configured for the terminal that correspond to the uplink signal; $W_0(i)$ represents a reference precoding matrix with a dimension of P×υ; $y^{(p)}(i)$ represents a symbol mapped to an antenna port p and corresponding to x(i), and p represents an index of the antenna port; $x(i) = [x^{(0)}(i) \ldots x^{(v-1)}(i)]^T$;

or, in a case that the codewords in the first candidate codeword set have a dimension of P×υ, the processor is further configured to:

perform precoding processing of the data stream of the uplink signal by using following formula:

$$\begin{bmatrix} y^{(0)}(i) \\ M \\ y^{(P-1)}(i) \end{bmatrix} = W_1(i) \begin{bmatrix} x^{(0)}(i) \\ M \\ x^{(v-1)}(i) \end{bmatrix}$$

wherein, $x^{(u)}(i)$ represents the data symbol with the index i in the data stream with the index u of the uplink signal, v represents the quantity of data streams; P represents the quantity of antenna ports configured for the terminal that correspond to the uplink signal; $y^{(p)}(i)$ represents the symbol mapped to the antenna port p and corresponding to x(i), p represents the index of the antenna port; $W_1(i)$ represents a $(q_1+1)$-th codeword of an m-th candidate codeword set in a candidate precoding matrix set $W_1^s(i)$; $W_1^s(i)$ includes R candidate codeword sets, the first candidate codeword set is one of the R candidate codeword sets; wherein a q-th codeword $W_{q,s}$ in an r-th candidate codeword set satisfies $W_{q,s}=D^q W_r$; $D^q$ represents a q-th codeword in a second candidate codeword set formed by a square matrix with a dimension of P×P; $W_r$ represents a reference precoding matrix with a dimension of P×υ; $x(i)=[x^{(0)}(i) \ldots x^{(\upsilon-1)}(i)]^T$.

Optionally, the scheduling bandwidth of the uplink signal includes a total of B subbands with indexes from 0 to B−1, and the B is an integer greater than or equal to 1;

in a case that an index of a resource element to which the x(i) is to be mapped in a subband where the resource element is located is $L_1$, the $q_1=\mathrm{mod}(M_2, L_1)$; or in a case that an index of a subband where a resource element to which the x(i) is to be mapped is located is $L_2$, the $q_1=\mathrm{mod}(M_2, L_2)$;

wherein $M_2$ is a quantity of codewords in the first candidate codeword set.

Optionally, the value of the $\theta_1$, $\theta_2$ or $\theta_3$ is determined by the terminal itself; or, the value of the $\theta_1$, $\theta_2$ or $\theta_3$ is determined by the terminal according to a pre-agreed first angle threshold, and is not greater than the first angle threshold; or, the value of the $\theta_1$, $\theta_2$ or $\theta_3$ is determined by the terminal according to a second angle threshold sent by a base station, and is not greater than the second angle threshold; or, the value of the $\theta_1$, $\theta_2$ or $\theta_3$ is a value stipulated in protocol; or, the value of the $\theta_1$, $\theta_2$ or $\theta_3$ is a value determined according to the scheduling bandwidth of the uplink signal; or, the value of the $\theta_1$, $\theta_2$ or $\theta_3$ is a value determined according to the subband bandwidth in the scheduling bandwidth of the uplink signal; or, the value of the $\theta_1$, $\theta_2$ or $\theta_3$ is indicated to the terminal by the base station through signaling.

Optionally, the reference precoding matrix is a precoding matrix indicated by the base station to the terminal through a TPMI; or, the reference precoding matrix is a predefined precoding matrix; or, the reference precoding matrix is a precoding matrix selected from the uplink codebook.

Optionally, the uplink signal is one or more of PUSCH, PUCCH, DMRS of PUSCH, and DMRS of PUCCH.

Optionally, the terminal is configured with codebook-based uplink signal transmission, and the coherent transmission capability of the terminal does not match the codeword or codebook subset restriction parameters configured by the base station;

or, the terminal is configured with codebook-based uplink signal transmission, and the terminal is configured for single-stream transmission;

or, the terminal is configured with codebook-based uplink signal transmission, and the terminal is configured for single-stream transmission, and the coherent transmission capability of the terminal does not match the codeword or codebook subset restriction parameters configured by the base station.

Optionally, the transceiver is further configured to receive the indication information sent by a base station for indicating that predetermined processing of the uplink signal is to be performed on multiple antenna ports, wherein the predetermined processing includes: performing delay processing of the uplink signal on multiple antenna ports during a precoding process, or performing precoding processing of the uplink signal on multiple antenna ports by cyclically using codebooks in a candidate codebook set.

An embodiment of the present disclosure further provides another terminal, the structure of which is similar to that described in FIG. 8. The terminal includes:

an encoding processing unit, configured to perform precoding processing of an uplink signal on multiple antenna ports by cyclically using codewords in a first candidate codeword set;

a transceiver unit, configured to transmit the precoding-processed uplink signal.

Optionally, in a case that the codewords in the first candidate codeword set have a dimension of P×P, the encoding processing unit is further configured to:

perform precoding processing of a data stream of the uplink signal by using following formula:

$$\begin{bmatrix} y^{(0)}(i) \\ M \\ y^{(P-1)}(i) \end{bmatrix} = D^{q_1}(i) W_0(i) \begin{bmatrix} x^{(0)}(i) \\ M \\ x^{(\upsilon-1)}(i) \end{bmatrix}$$

wherein, $x^{(u)}(i)$ represents a data symbol with an index i in a data stream with an index u of the uplink signal, v represents a quantity of data streams; $D^{q_1}(i)$ represents a codeword with an index $q_1$ in the first candidate codeword set; P represents a quantity of antenna ports configured for the terminal that correspond to the uplink signal; $W_0(i)$ represents a reference precoding matrix with a dimension of P×υ; $y^{(p)}(i)$ represents a symbol mapped to an antenna port p and corresponding to x(i), and p represents an index of the antenna port; $x(i)=[x^{(0)}(i) \ldots x^{(\upsilon-1)}(i)]^T$;

or, in a case that the codewords in the first candidate codeword set have a dimension of P×υ, the encoding processing unit is further configured to:

perform precoding processing of the data stream of the uplink signal by using following formula:

$$\begin{bmatrix} y^{(0)}(i) \\ M \\ y^{(P-1)}(i) \end{bmatrix} = W_1(i) \begin{bmatrix} x^{(0)}(i) \\ M \\ x^{(\upsilon-1)}(i) \end{bmatrix}$$

wherein, $x^{(u)}(i)$ represents the data symbol with the index i in the data stream with the index u of the uplink signal, v represents the quantity of data streams; P represents the quantity of antenna ports configured for the terminal that correspond to the uplink signal; $y^{(p)}(i)$ represents the symbol mapped to the antenna port p and corresponding to x(i), p represents the index of the antenna port; $W_1(i)$ represents a $(q_1+1)$-th codeword of an m-th candidate codeword set in a candidate precoding matrix set $W_1^s(i)$; $W_1^s(i)$ includes R candidate codeword sets, the first candidate codeword set is one of the R candidate codeword sets; wherein a q-th codeword $W_{q,s}$ in an r-th candidate codeword set satisfies $W_{q,s}=D^q W_r$; $D^q$ represents a q-th codeword in a second candidate codeword set formed by a square matrix with a dimension of P×P; $W_r$ represents a reference precoding matrix with a dimension of P×υ; $x(i)=[x^{(0)}(i) \ldots x^{(\upsilon-1)}(i)]^T$.

Optionally, the scheduling bandwidth of the uplink signal includes a total of B subbands with indexes from 0 to B−1, and B is an integer greater than or equal to 1;

in a case that an index of a resource element to which the x(i) is to be mapped in a subband where the resource element is located is $L_1$, the $q_1=\mod(M_2, L_1)$; or in a case that an index of a subband where a resource element to which the x(i) is to be mapped is located is $L_2$, the $q_1=\mod(M_2, L_2)$;

wherein $M_2$ is a quantity of codewords in the first candidate codeword set.

Figure 9:
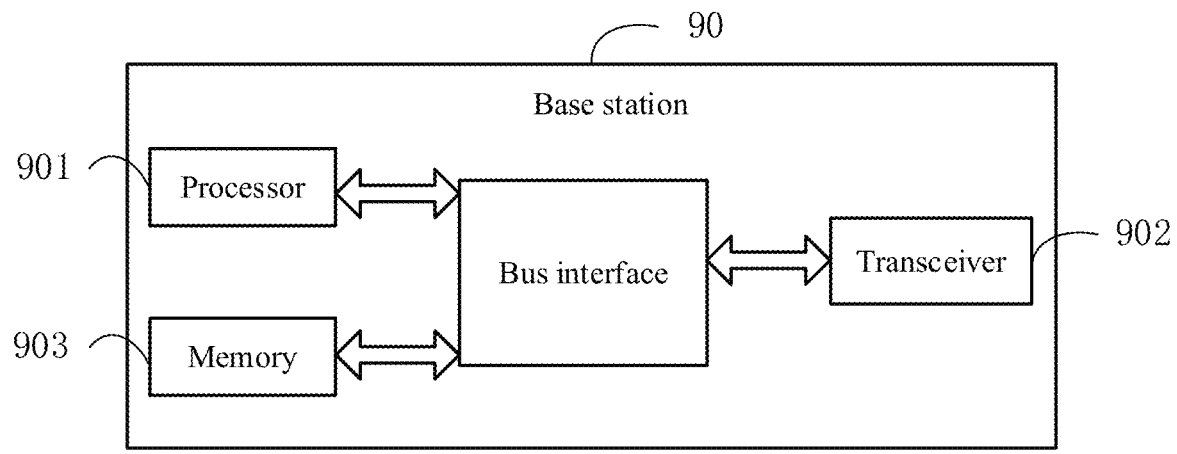
FIG. 9 is a schematic structural diagram of a base station provided by an embodiment of the present disclosure.

Referring to FIG. 9, an embodiment of the present disclosure provides a schematic structural diagram of a base station 900. The base station 900 includes: a processor 901, a transceiver 902, a memory 903, and a bus interface.

In the embodiment of the present disclosure, the base station 900 further includes: a computer program stored in the memory 903 and executable by the processor 901.

In the embodiment of the present disclosure, the base station 900 further includes: a computer program stored in the memory 903 and executable by the processor 901.

The processor 901 is configured to read the computer program in the memory to implement the following process: determining scheduling information of an uplink signal according to a transmission scheme of a terminal for the uplink signal;

wherein, the transmission scheme includes: performing delay processing of the uplink signal on multiple antenna ports in a precoding process, or performing precoding processing of the uplink signal on multiple antenna ports by cyclically using codebooks in a candidate codebook set.

In FIG. 9, a bus architecture may include any number of interconnected buses and bridges, and connects various circuits including one or more processors specifically represented by the processor 901 and memory represented by the memory 903. The bus architecture may also connect various other circuits such as peripherals, voltage regulators and power management circuits, which is well known in the art. Therefore, a detailed description thereof is omitted herein. A bus interface provides an interface. The transceiver 902 may include a plurality of elements, that is, a transmitter and a receiver, to provide a unit for communication with various other apparatuses on a transmission medium.

The processor 901 is responsible for supervising the bus architecture and normal operation and the memory 903 may store the data being used by the processor 701 during operation.

Optionally, the scheduling information of the uplink signal includes at least one of MCS, transmit precoding matrix indicator (TPMI), a quantity of transmission layers, and corresponding SRS resource indication.

Optionally, the processor 901 is further configured to detect the uplink signal by adopting a scheme corresponding to a precoding scheme of the terminal for the uplink signal.

Optionally, the performing the delay processing of the uplink signal on the multiple antenna ports, or performing the precoding processing of the uplink signal on the multiple antenna ports by cyclically using the codebooks in the candidate codebook set includes:

performing precoding processing of a data stream of the uplink signal by using following formula:

$$\begin{bmatrix} y^{(0)}(i) \\ M \\ y^{(P-1)}(i) \end{bmatrix} = D(i)W_0(i) \begin{bmatrix} x^{(0)}(i) \\ M \\ x^{(\upsilon-1)}(i) \end{bmatrix}$$

wherein, $x^{(u)}(i)$ represents a data symbol with an index i in a data stream with an index u of the uplink signal, υ represents a quantity of data streams; D(i) represents a square matrix with a dimension of P×P that corresponds to x(i), P represents a quantity of antenna ports configured for the terminal that correspond to the uplink signal; $x(i)=[x^{(0)}(i) \ldots x^{(\upsilon-1)}(i)]^T$; $W_0(i)$ represents a reference precoding matrix with a dimension P×υ that corresponds to x(i), $x(i)=[x^{(0)}(i) \ldots x^{(\upsilon-1)}(i)]^T$; $y^{(p)}(i)$ represents a symbol mapped to an antenna port p and corresponding to x(i), p represents an index of the antenna port;

or, performing precoding processing of the data stream of the uplink signal by using following formula:

$$\begin{bmatrix} y^{(0)}(i) \\ M \\ y^{(P-1)}(i) \end{bmatrix} = W_1(i) \begin{bmatrix} x^{(0)}(i) \\ M \\ x^{(\upsilon-1)}(i) \end{bmatrix}$$

wherein, $x^{(u)}(i)$ represents the data symbol with an index i in the data stream with an index u of the uplink signal; υ represents the quantity of data streams; P represents the quantity of antenna ports configured for the terminal that correspond to the uplink signal; $x(i)=[x^{(0)}(i) \ldots x^{(\upsilon-1)}(i)]^T$; $W_1(i)$ represents a predetermined precoding matrix with a dimension of P×υ in a precoding matrix group in a candidate precoding matrix set $W_1^s(i)$; $y^{(p)}(i)$ represents the symbol mapped to the antenna port p and corresponding to x(i), and p represents the index of the antenna port; the candidate precoding matrix set $W_1^s(i)$ includes R precoding matrix groups, wherein a q-th precoding matrix $W_{q,s}$ in an r-th precoding matrix group satisfies $W_{q,s}=D^q W_r$; $D^q$ represents a q-th codeword in a first candidate codeword set formed by a square matrix with a dimension of P×P; $W_r$ represents a reference precoding matrix with a dimension of P×υ; υ represents a quantity of data streams used to calculate an equivalent channel; P represents the quantity of antenna ports configured for the terminal that correspond to the uplink signal.

Optionally, the processor 901 is further configured to acquire an equivalent uplink channel by using a second formula, and determine the scheduling information of the uplink signal by using the equivalent uplink channel; the second formula is:

$H(i)'=D(i)W(i)H(i);$ wherein H(i) is an uplink channel estimation value which corresponds to a resource element with an index i and is acquired by the base station according to a reference signal for uplink channel state information (CSI) acquisition, H(i)' is an equivalent channel of an uplink channel which corresponds to a resource element with an index i and is acquired by the base station according to the reference signal for uplink CSI acquisition; D(i) is a square matrix with a dimension of P×P that corresponds to the resource element with the index i, P represents a quantity of antenna ports configured for the terminal that correspond to the uplink signal; W(i) is a reference precoding matrix used by the base station to calculate the equivalent channel corresponding to the resource element with the index i, all resource elements in a same subband correspond to a same D(i), and there is a predetermined rule between a value of D(i) and a number or frequency of the subband, or the value of D(i) is determined according to a frequency domain position of the resource element with the index i in the subband;

or, the second formula is:

$$H(i)'=W_1(i)H(i)$$

wherein H(i) is the uplink channel estimation value which corresponds to a resource element with an index i and is acquired by the base station according to the reference signal for uplink CSI acquisition, H(i)' is the equivalent channel of the uplink channel which corresponds to a resource element with an index i and is acquired by the base station according to the reference signal for uplink CSI acquisition; $W_1(i)$ represents a precoding matrix $W_1$ in the codeword set $W_1^s(i)$ that corresponds to the resource element i; $W_1^s(i)$ is dividable into K codeword groups, wherein a q-th codeword in a k-th codeword group satisfies $W_{q,s}=D^q W_k$; $D^q$ represents a q-th codeword in a second candidate codeword set formed by a square matrix with a dimension of P×P; $W_k$ represents a reference precoding matrix with a dimension of P×υ; the base station determines $W_1$ of each resource element by cyclically using codewords in the first candidate codeword set, the first candidate codeword set is a codeword group in $W_1^s(i)$.

Optionally, the processor 901 is further configured to acquire an equivalent uplink channel by using a second formula, and detect the uplink signal by using the equivalent uplink channel; the second formula is:

$$H(i)'=D(i)W(i)H(i);$$

wherein H(i) is an uplink channel estimation value which corresponds to a resource element with an index i and is acquired by the base station according to a reference signal for uplink CSI acquisition, H(i)' is an equivalent channel of an uplink channel which corresponds to a resource element with an index i and is acquired by the base station according to the reference signal for uplink CSI acquisition; D(i) is a square matrix with a dimension of P×P that corresponds to the resource element with the index i, P represents a quantity of antenna ports configured for the terminal that correspond to the uplink signal; W(i) is a reference precoding matrix used by the base station to calculate the equivalent channel corresponding to the resource element with the index i, all resource elements in a same subband correspond to a same D(i), and there is a predetermined rule between a value of D(i) and a number or frequency of the subband, or the value of D(i) is determined according to a frequency domain position of the resource element with the index i in the subband;

or, the second formula is:

$$H(i)'=W_1(i)H(i)$$

wherein H(i) is the uplink channel estimation value which corresponds to the resource element with the index i and is acquired by the base station according to the reference signal for uplink CSI acquisition, H(i)' is the equivalent channel of the uplink channel which corresponds to the resource element with an index i and is acquired by the base station according to the reference signal for uplink CSI acquisition; $W_1(i)$ represents a precoding matrix $W_1$ in the codeword set $W_1^s(i)$ that corresponds to the resource element i; $W_1^s(i)$ is dividable into K codeword groups, wherein a q-th codeword in a k-th codeword group satisfies $W_{q,s}=D^q W_k$; $D^q$ represents a q-th codeword in a second candidate codeword set formed by a square matrix with a dimension of P×P; $W_k$ represents a reference precoding matrix with a dimension of P×υ; the base station determines $W_1$ of each resource element by cyclically using codewords in the first candidate codeword set, the first candidate codeword set is a codeword group in $W_1^s(i)$.

The transceiver 902 is configured to send an indication message for determining the D(i) to the terminal.

Optionally, the value of the element $d(i)_{l,m}$ in the l-th row and m-th column of the D(i) or $D^q$ is determined in the following manner:

$$d(i)_{l,m} = \begin{cases} 0, & l \neq m \\ e^{-j(l-1)\theta_1 n_1/P}, & l=m \end{cases};$$

or, in a case that the terminal has a non-coherent transmission capability, $$d(i)_{l,m} = \begin{cases} 0, & l \neq m \\ e^{-j(l-1)\theta_2 n_1/P}, & l=m \end{cases};$$

in a case that the terminal has a full-coherent transmission capability, $$d(i)_{l,m} = \begin{cases} 0, & l \neq m \\ 1, & l=m \end{cases};$$

in a case that the terminal has a partial-coherent transmission capability, $$d(i)_{l,m} = \begin{cases} 0, & l \neq m \\ e^{-ja_z\theta_3 n_1/P}, & l=m \end{cases};$$

wherein $a_z$ is the coefficient corresponding to the z-th coherent transmission antenna group; each of the $\theta_1$, $\theta_2$ and $\theta_3$ is a predetermined angle value; $n_1$ is an integer greater than 0.

Optionally, the value of the $\theta_1$, $\theta_2$ or $\theta_3$ is determined according to a pre-agreed first angle threshold, and is not greater than the first angle threshold; or, the value of the $\theta_1$, $\theta_2$ or $\theta_3$ is determined according to a sent second angle threshold, and is not greater than the second angle threshold, and the transceiver 902 is further configured to send the second angle threshold to the terminal; or, the value of the $\theta_1$, $\theta_2$ or $\theta_3$ is a value stipulated in protocol; or, the value of the $\theta_1$, $\theta_2$ or $\theta_3$ has a correspondence with the scheduling bandwidth of the uplink signal; or, the value of the $\theta_1$, $\theta_2$ or $\theta_3$ has a correspondence with the subband bandwidth in the scheduling bandwidth of the uplink signal; or, the transceiver 902 is further configured to indicate the value of the $\theta_1$, $\theta_2$ or $\theta_3$ to the terminal through signaling.

Optionally, the W(i) or $W_1(i)$ is a precoding matrix indicated by the base station to the terminal through a TPMI; or, the W(i) or $W_1(i)$ is a predefined precoding matrix.

Optionally, the transceiver 902 is further configured to send to the terminal indication information for indicating that predetermined processing of the uplink signal is to be performed on multiple antenna ports, and the predetermined processing includes performing delay processing of the uplink signals on multiple antenna ports during a precoding process or performing precoding processing of the uplink signal on multiple antenna ports by cyclically using codebooks in a candidate codebook set.

Figure 10:
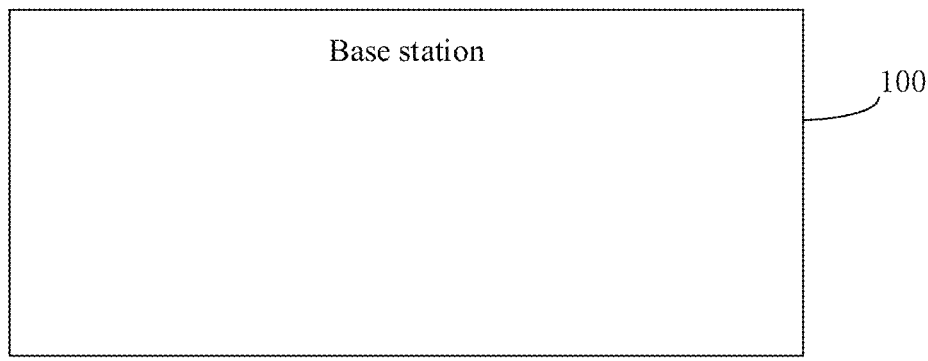
FIG. 10 is another schematic structural diagram of a base station provided by an embodiment of the present disclosure.

Referring to FIG. 10, an embodiment of the present disclosure provides another structure of a base station 100. As shown in FIG. 10, the base station 100 includes:

a determining unit 101, configured to determine scheduling information of an uplink signal according to a transmission scheme of a terminal for the uplink signal;

wherein, the transmission scheme includes: performing delay processing of the uplink signal on multiple antenna ports in a precoding process, or performing precoding processing of the uplink signal on multiple antenna ports by cyclically using codebooks in a candidate codebook set.

Optionally, the scheduling information of the uplink signal includes at least one of MCS, transmit precoding matrix indicator (TPMI), a quantity of transmission layers, and corresponding SRS resource indication.

Optionally, the base station further includes:

a detecting unit, configured to detect the uplink signal by adopting a scheme corresponding to a precoding scheme of the terminal for the uplink signal.

Optionally, the performing the delay processing of the uplink signal on the multiple antenna ports, or performing the precoding processing of the uplink signal on the multiple antenna ports by cyclically using the codebooks in the candidate codebook set includes:

performing precoding processing of a data stream of the uplink signal by using following formula:

$$\begin{bmatrix} y^{(0)}(i) \\ M \\ y^{(P-1)}(i) \end{bmatrix} = D(i)W_0(i) \begin{bmatrix} x^{(0)}(i) \\ M \\ x^{(v-1)}(i) \end{bmatrix}$$

wherein, $x^{(u)}(i)$ represents a data symbol with an index i in a data stream with an index u of the uplink signal, v represents a quantity of data streams; $D(i)$ represents a square matrix with a dimension of P×P that corresponds to $x(i)$, P represents a quantity of antenna ports configured for the terminal that correspond to the uplink signal; $x(i)=[x^{(0)}(i) \ldots x^{(v-1)}(i)]^T$; $W_0(i)$ represents a reference precoding matrix with a dimension of P×υ that corresponds to $x(i)$, $x(i)=[x^{(0)}(i) \ldots x^{(v-1)}(i)]^T$; $y^{(p)}(i)$ represents a symbol mapped to an antenna port p and corresponding to $x(i)$, p represents an index of the antenna port;

or, performing precoding processing of the data stream of the uplink signal by using following formula:

$$\begin{bmatrix} y^{(0)}(i) \\ M \\ y^{(P-1)}(i) \end{bmatrix} = W_1(i) \begin{bmatrix} x^{(0)}(i) \\ M \\ x^{(v-1)}(i) \end{bmatrix}$$

wherein, $x^{(u)}(i)$ represents the data symbol with an index i in the data stream with an index u of the uplink signal; v represents the quantity of data streams; P represents the quantity of antenna ports configured for the terminal that correspond to the uplink signal; $x(i)=[x^{(0)}(i) \ldots x^{(v-1)}(i)]^T$; $W_1(i)$ represents a predetermined precoding matrix with a dimension of P×υ in a precoding matrix group in a candidate precoding matrix set $W_1^s(i)$; $y^{(p)}(i)$ represents the symbol mapped to the antenna port p and corresponding to $x(i)$, and p represents the index of the antenna port; the candidate precoding matrix set $W_1^s(i)$ includes R precoding matrix groups, wherein a q-th precoding matrix $W_{q,s}$ in an r-th precoding matrix group satisfies $W_{q,s}=D^qW_r$; $D^q$ represents a q-th codeword in a first candidate codeword set formed by a square matrix with a dimension of P×P; $W_r$ represents a reference precoding matrix with a dimension of P×υ; v represents a quantity of data streams used to calculate an equivalent channel; P represents the quantity of antenna ports configured for the terminal that correspond to the uplink signal.

Optionally, the determining unit 101 is further configured to acquire an equivalent uplink channel, and determine the scheduling information of the uplink signal by using the equivalent uplink channel;

the second formula is:

$H(i)'=D(i)W(i)H(i);$ wherein H(i) is an uplink channel estimation value which corresponds to a resource element with an index i and is acquired by the base station according to a reference signal for uplink CSI acquisition, H(i)' is an equivalent channel of an uplink channel which corresponds to a resource element with an index i and is acquired by the base station according to the reference signal for uplink CSI acquisition; D(i) is a square matrix with a dimension of P×P that corresponds to the resource element with the index i, P represents a quantity of antenna ports configured for the terminal that correspond to the uplink signal; W(i) is a reference precoding matrix used by the base station to calculate the equivalent channel corresponding to the resource element with the index i, all resource elements in a same subband correspond to a same D(i), and there is a predetermined rule between a value of D(i) and a number or frequency of the subband, or the value of D(i) is determined according to a frequency domain position of the resource element with the index i in the subband;

or, the second formula is:

$H(i)'=W_1(i)H(i)$ wherein H(i) is the uplink channel estimation value which corresponds to the resource element with the index i and is acquired by the base station according to the reference signal for uplink CSI acquisition, H(i)' is the equivalent channel of the uplink channel which corresponds to the resource element with the index i and is acquired by the base station according to the reference signal for uplink CSI acquisition; $W_1(i)$ represents a precoding matrix $W_1$ in the codeword set $W_1^s(i)$ that corresponds to the resource element i; $W_1^s(i)$ is dividable into K codeword groups, wherein a q-th codeword in a k-th codeword group satisfies $W_{q,s}=D^qW_k$; $D^q$ represents a q-th codeword in a second candidate codeword set formed by a square matrix with a dimension of P×P; $W_k$ represents a reference precoding matrix with a dimension of P×υ; the base station determines $W_1$ of each resource element by cyclically using codewords in the first candidate codeword set, the first candidate codeword set is a codeword group in $W_1^s(i)$.

Optionally, the processor 901 is further configured to acquire an equivalent uplink channel by using a second formula, and detect the uplink signal by using the equivalent uplink channel; the second formula is:

$$H(i)' = D(i)W(i)H(i);$$

wherein H(i) is an uplink channel estimation value which corresponds to a resource element with an index i and is acquired by the base station according to a reference signal for uplink CSI acquisition, H(i)' is an equivalent channel of an uplink channel which corresponds to a resource element with an index i and is acquired by the base station according to the reference signal for uplink CSI acquisition; D(i) is a square matrix with a dimension of P×P that corresponds to the resource element with the index i, P represents a quantity of antenna ports configured for the terminal that correspond to the uplink signal; W(i) is a reference precoding matrix used by the base station to calculate the equivalent channel corresponding to the resource element with the index i, all resource elements in a same subband correspond to a same D(i), and there is a predetermined rule between a value of D(i) and a number or frequency of the subband, or the value of D(i) is determined according to a frequency domain position of the resource element with the index i in the subband;

or, the second formula is:

$$H(i)' = W(i)H(i)$$

wherein H(i) is the uplink channel estimation value which corresponds to the resource element with the index i and is acquired by the base station according to the reference signal for uplink CSI acquisition, H(i)' is the equivalent channel of the uplink channel which corresponds to the resource element with the index i and is acquired by the base station according to the reference signal for uplink CSI acquisition; $W_1(i)$ represents a precoding matrix $W_1$ in the codeword set $W_1^s(i)$ that corresponds to the resource element i; $W_1^s(i)$ is dividable into K codeword groups, wherein a q-th codeword in a k-th codeword group satisfies $W_{q,s} = D^q W_k$; $D^q$ represents a q-th codeword in a second candidate codeword set formed by a square matrix with a dimension of P×P; $W_k$ represents a reference precoding matrix with a dimension of P×υ; the base station determines $W_1$ of each resource element by cyclically using codewords in the first candidate codeword set, the first candidate codeword set is a codeword group in $W_1^s(i)$.

The base station further includes a transceiver unit configured to send an indication message for determining the D(i) to the terminal.

Optionally, the value of the element $d(i)_{l,m}$ in the l-th row and m-th column of the D(i) or $D^q$ is determined in the following manner:

$$d(i)_{l,m} = \begin{cases} 0, & l \neq m \\ e^{-j(l-1)\theta_1 n_1/P}, & l = m \end{cases};$$

or, in a case that the terminal has a non-coherent transmission capability, $$d(i)_{l,m} = \begin{cases} 0, & l \neq m \\ e^{-j(l-1)\theta_2 n_1/P}, & l = m \end{cases};$$

in a case that the terminal has a full-coherent transmission capability, $$d(i)_{l,m} = \begin{cases} 0, & l \neq m \\ 1, & l = m \end{cases};$$

in a case that the terminal has a partial-coherent transmission capability, $$d(i)_{l,m} = \begin{cases} 0, & l \neq m \\ e^{-ja_z \theta_3 n_1/P}, & l = m \end{cases};$$

wherein $a_z$ is the coefficient corresponding to the z-th coherent transmission antenna group; each of the $\theta_1$, $\theta_2$ and $\theta_3$ is a predetermined angle value; $n_1$ is an integer greater than 0.

Optionally, the value of the $\theta_1$, $\theta_2$ or $\theta_3$ is determined according to a pre-agreed first angle threshold, and is not greater than the first angle threshold; or, the value of the $\theta_1$, $\theta_2$ or $\theta_3$ is determined according to a sent second angle threshold, and is not greater than the second angle threshold, and the base station further includes: a transceiver unit configured to send the second angle threshold to the terminal; or, the value of the $\theta_1$, $\theta_2$ or $\theta_3$ is a value stipulated in a protocol; or, the value of the $\theta_1$, $\theta_2$ or $\theta_3$ has a correspondence with the scheduling bandwidth of the uplink signal; or, the value of the $\theta_1$, $\theta_2$ or $\theta_3$ has a correspondence with the subband bandwidth in the scheduling bandwidth of the uplink signal; or, the transceiver unit is further configured to indicate the value of the $\theta_1$, $\theta_2$ or $\theta_3$ to the terminal through signaling.

Optionally, the W(i) or $W_1(i)$ is a precoding matrix indicated by the base station to the terminal through a TPMI; or, the W(i) or $W_1(i)$ may be a predefined precoding matrix.

Optionally, the transceiver unit is further configured to send to the terminal indication information for indicating that predetermined processing of the uplink signal is to be performed on multiple antenna ports, and the predetermined processing includes performing delay processing of the uplink signals on multiple antenna ports during a precoding process or performing precoding processing of the uplink signal on multiple antenna ports by cyclically using codebooks in a candidate codebook set.

A person skilled in the art may be aware that, the exemplary units and algorithm steps described in connection with the embodiments disclosed herein may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for ease of description and conciseness, for a detailed working process of the foregoing system, apparatus, and unit, reference may be made to a corresponding process in the foregoing method embodiments, and details are not described herein again.

In the embodiments provided in the present application, it should be understood that the disclosed device and method may be implemented in other manners. For example, the described device embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electric, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units may be integrated into one unit.

If the functions are implemented in a form of a software functional unit and sold or used as an independent product, the functions may be stored in a computer-readable storage medium. Based on such an understanding, essential parts, or parts contributing to the related art, of the technical solution of the present disclosure, or a part of the technical solution may be implemented in form of a software product. The computer software product is stored in a storage medium, and includes several instructions for instructing a computer device (which may be a personal computer, a server, or a network device, etc.) to perform all or a part of the steps of the methods described in the embodiments of the disclosure. The foregoing storage medium includes any medium that can store program code, such as a USB flash drive, a removable hard disk, an ROM, an RAM, a magnetic disk, or an optical disc.

One of ordinary skill in the art may appreciate that all or a part of the flows of the methods of aforementioned embodiments may be implemented through hardware controlled by computer programs. The computer program may be stored in a computer readable storage medium. The program, when being executed, may include flows of the methods described in the above embodiments. The storage medium may be a magnetic disk, an optical disc, a read-only memory (ROM), or a random access memory (RAM), etc.

It may be understood that these embodiments described in the embodiments of this disclosure may be implemented by hardware, software, firmware, middleware, microcode, or a combination thereof. For a hardware implementation, a processing unit may be implemented in one or more application specific integrated circuits (ASICs), a digital signal processor (DSP), a digital signal processing device (DSPD), a programmable logic device (PLD), a field-programmable gate array (FPGA), a general purpose processor, a controller, a microcontroller, a microprocessor, another electronic unit used for performing the functions described in this disclosure, or a combination thereof.

For a software implementation, the technologies described in the embodiments of this disclosure may be implemented by using a module (e.g. a process, function, or the like) for performing the functions described in the embodiments of this disclosure. Software code may be stored in a memory and executed by a processor. The memory may be implemented inside the processor or outside the processor.

The aforementioned are merely specific implementations of the present disclosure, but the scope of the disclosure is by no means limited thereto. Any modifications or replacements that would easily occurred to those skilled in the art, without departing from the technical scope disclosed in the disclosure, should be encompassed in the scope of the present disclosure. Therefore, the scope of the present disclosure is to be determined by the scope of the claims.

What is claimed is:

1. An uplink transmission method, applied to a terminal, comprising:
performing delay processing of an uplink signal on multiple antenna ports and then transmitting the uplink signal;
wherein
the performing the delay processing of the uplink signal on the multiple antenna ports comprises:
performing precoding processing of a data stream of the uplink signal by using following formula:

$$\begin{bmatrix} y^{(0)}(i) \\ M \\ y^{(P-1)}(i) \end{bmatrix} = D(i)W_0(i) \begin{bmatrix} x^{(0)}(i) \\ M \\ x^{(v-1)}(i) \end{bmatrix}$$

wherein, $x^{(u)}(i)$ represents a data symbol with an index i in a data stream with an index u of the uplink signal, v represents a quantity of data streams; $D(i)$ represents a square matrix with a dimension of P×P that corresponds to $x(i)$ P represents a quantity of antenna ports configured for the terminal that correspond to the uplink signal; $x(i)=[x^{(0)}(i) \ldots x^{(v-1)}(i)]^T$; $W_0(i)$ represents a reference precoding matrix with a dimension of P×v that corresponds to $x(i)$; $y^{(p)}(i)$ represents a symbol mapped to an antenna port p and corresponding to $x(i)$, p represents an index of the antenna port;
or,
the performing the delay processing of the uplink signal on the multiple antenna ports comprises:
performing precoding processing of a data stream of the uplink signal by using following formula:

$$\begin{bmatrix} y^{(0)}(i) \\ M \\ y^{(P-1)}(i) \end{bmatrix} = W_1(i) \begin{bmatrix} x^{(0)}(i) \\ M \\ x^{(v-1)}(i) \end{bmatrix}$$

wherein, $x^{(u)}(i)$ represents a data symbol with an index i in a data stream with an index u of the uplink signal; v represents a quantity of data streams; P represents a quantity of antenna ports configured for the terminal that correspond to the uplink signal; $x(i)=[x^{(0)}(i) \ldots x^{(v-1)}(i)]^T$; $W_1(i)$ represents a predetermined precoding matrix with a dimension of P×v in a precoding matrix group in a candidate precoding matrix set $W_1^s(i)$; $y^{(p)}(i)$ represents a symbol mapped to an antenna port p and corresponding to $x(i)$, and p represents an index of the antenna port;
the candidate precoding matrix set $W_1^s(i)$ comprises R precoding matrix groups, wherein a q-th precoding matrix $W_{q,s}$ in an r-th precoding matrix group satisfies $W_{q,s}=D^q W_r$; $D^q$ represents a q-th codeword in a first candidate codeword set formed by a square matrix with a dimension of P×P; $W_r$ represents a reference precoding matrix with a dimension of P×v.

2. The uplink transmission method according to claim 1, wherein
the D(i) is a square matrix related to a coherent transmission capability of the terminal;
or,
the D(i) is a diagonal matrix, and elements on a main diagonal correspond to different phase offsets respectively;
or,
in a case that the terminal has a non-coherent transmission capability, the D(i) is a diagonal matrix, and elements on a main diagonal correspond to different phase offsets respectively; in a case that the terminal has a full-coherent transmission capability, the D(i) is an identity matrix; in a case that the terminal has a partial-coherent transmission capability, the D(i) is a diagonal matrix, and elements corresponding to a same coherent transmission antenna group have a same phase offset, elements corresponding to different coherent transmission antenna groups have different phase offsets.

3. The uplink transmission method according to claim 2, wherein
a value of an element $d(i)_{l,m}$ in an l-th row and an m-th column of the D(i) is determined in following manner:

$$d(i)_{l,m} = \begin{cases} 0, & l \neq m \\ e^{-j(l-1)\theta_1 n_1/P}, & l = m \end{cases};$$

or,
in a case that the terminal has the non-coherent transmission capability, $$d(i)_{l,m} = \begin{cases} 0, & l \neq m \\ e^{-j(l-1)\theta_2 n_1/P}, & l = m \end{cases};$$

in a case that the terminal has the full-coherent transmission capability, $$d(i)_{l,m} = \begin{cases} 0, & l \neq m \\ 1, & l = m \end{cases};$$

in a case that the terminal has the partial-coherent transmission capability, $$d(i)_{l,m} = \begin{cases} 0, & l \neq m \\ e^{-j a_z \theta_3 n_1/P}, & l = m \end{cases};$$

wherein $a_z$ is a coefficient corresponding to a z-th coherent transmission antenna group; each of the $\theta_1$, $\theta_2$ and $\theta_3$ is a predetermined angle value; $n_1$ is an integer greater than 0.

4. The uplink transmission method according to claim 3, wherein a scheduling bandwidth of the uplink signal comprises B subbands, B is an integer greater than or equal to 1;
in D(i) corresponding to each x(i) mapped to a same subband, a value of $n_1$ is the same, and the value of $n_1$ increases or decreases with increasing frequencies corresponding to the subbands; or
in D(i) corresponding to each x(i) mapped to the same subband, the value of $n_1$ is determined according to a frequency domain position of a resource element corresponding to the x(i) in the subband, and the value of $n_1$ increases or decreases as a frequency of the resource element corresponding to the x(i) increases;
or,
wherein a scheduling bandwidth of the uplink signal comprises B subbands, B is an integer greater than or equal to 1;
the subbands are numbered from 1 to B in a frequency-increasing manner, and $n_1$ is equal to a number of a subband where a resource element to which x(i) is to be mapped is located, or
resource elements occupied by data symbols are numbered from 1 in a frequency-increasing manner in one of the subbands, and $n_1$ is equal to a number of a data symbol of the x(i) in the subband.

5. The uplink transmission method according to claim 1, wherein a scheduling bandwidth of the uplink signal comprises B subbands, B is an integer greater than or equal to 1;
each x(i) mapped to a same subband corresponds to a same D(i), and there is a predetermined rule between a value of the D(i) and a number or frequency of the subband; or
a value of D(i) corresponding to each x(i) mapped to the same subband is determined according to a frequency domain position of a resource element corresponding to the x(i) in the subband.

6. The uplink transmission method according to claim 1, further comprising:
receiving an indication message sent by a base station for determining the D(i);
determining the D(i) according to the indication message.

7. The uplink transmission method according to claim 1, wherein a scheduling bandwidth of the uplink signal comprises B subbands, B is an integer greater than or equal to 1;
each x(i) mapped to a same subband corresponds to a same $W_1(i)$, and there is a predetermined rule between a value of the $W_1(i)$ and a number or frequency of the subband; or,
a value of $W_1(i)$ corresponding to each x(i) mapped to the same subband is determined according to a frequency domain position of a resource element corresponding to the x(i) in the subband.

8. The uplink transmission method according to claim 1, further comprising:
receiving an indication message sent by a base station for determining the $D^q$;
determining the $D^q$ according to the indication message.

9. The uplink transmission method according to claim 1, wherein
any codeword $D^q$ in the first candidate codeword set is a diagonal matrix, and elements on a main diagonal correspond to different phase offsets respectively;
or,
in a case that the terminal has a non-coherent transmission capability, any codeword D in the first candidate codeword set is a diagonal matrix, and elements on a main diagonal correspond to different phase offsets respectively; in a case that the terminal has a full-coherent transmission capability, any codeword D in the first candidate codeword set is an identity matrix; in a case that the terminal has a partial-coherent transmission capability, any codeword $D^q$ in the first candidate codeword set is a diagonal matrix, and elements corresponding to a same coherent transmission antenna group have a same phase offset, elements corresponding to different coherent transmission antenna groups have different phase offsets.

10. The uplink transmission method according to claim 1, wherein
a value of an element $d_{l,m}$ in an l-th row and an m-th column of the $D^q$ is determined in following manner:

$$d_{l,m} = \begin{cases} 0, & l \neq m \\ e^{-j(l-1)\theta_1 n_2/P}, & l = m \end{cases};$$

or,
in a case that the terminal has a non-coherent transmission capability, $$d_{l,m} = \begin{cases} 0, & l \neq m \\ e^{-j(l-1)\theta_2 n_2/P}, & l = m \end{cases};$$

in a case that the terminal has a full-coherent transmission capability, $$d_{l,m} = \begin{cases} 0, & l \neq m \\ 1, & l = m \end{cases};$$

in a case that the terminal has a partial-coherent transmission capability, $$d_{l,m} = \begin{cases} 0, & l \neq m \\ e^{-ja_z\theta_3 n_2/P}, & l = m \end{cases};$$

wherein, $a_z$ is a coefficient corresponding to a z-th coherent transmission antenna group; each of the $\theta_1$, $\theta_2$ and $\theta_3$ is a predetermined angle value; a value of $n_2$ ranges from 1 to M, wherein M is an integer greater than 1.

11. An uplink transmission method, applied to a terminal, comprising:
performing precoding processing of an uplink signal on multiple antenna ports by cyclically using codewords in a first candidate codeword set, and then transmitting the uplink signal;
wherein the performing the precoding processing of the uplink signal on the multiple antenna ports by cyclically using the codewords in the first candidate codeword set comprises:
in a case that the codewords in the first candidate codeword set have a dimension of P×P, performing precoding processing of a data stream of the uplink signal by using following formula:

$$\begin{bmatrix} y^{(0)}(i) \\ M \\ y^{(P-1)}(i) \end{bmatrix} = D^{q_1}(i)W_0(i)\begin{bmatrix} x^{(0)}(i) \\ M \\ x^{(v-1)}(i) \end{bmatrix}$$

wherein, $x^{(u)}(i)$ represents a data symbol with an index i in a data stream with an index u of the uplink signal, v represents a quantity of data streams; $D^{q_1}(i)$ represents a codeword with an index $q_1$ in the first candidate codeword set; P represents a quantity of antenna ports configured for the terminal that correspond to the uplink signal; $W_0(i)$ represents a reference precoding matrix with a dimension of P×υ; $y^{(p)}(i)$ represents a symbol mapped to an antenna port p and corresponding to x(i), and p represents an index of the antenna port; $x(i)=[x^{(0)}(i) \ldots x^{(v-1)}(i)]^T$;

or,
in a case that the codewords in the first candidate codeword set have a dimension of P×υ, performing precoding processing of the data stream of the uplink signal by using following formula:

$$\begin{bmatrix} y^{(0)}(i) \\ M \\ y^{(P-1)}(i) \end{bmatrix} = W_1(i)\begin{bmatrix} x^{(0)}(i) \\ M \\ x^{(v-1)}(i) \end{bmatrix}$$

wherein, $x^{(u)}(i)$ represents the data symbol with the index i in the data stream with the index u of the uplink signal, v represents the quantity of data streams; P represents the quantity of antenna ports configured for the terminal that correspond to the uplink signal; $y^{(p)}(i)$ represents the symbol mapped to the antenna port p and corresponding to x(i), p represents the index of the antenna port; $W_1(i)$ represents a $(q_j+1)$-th codeword of an m-th candidate codeword set in a candidate precoding matrix set $W_1^s(i)$; $W_1^s(i)$ comprises R candidate codeword sets, the first candidate codeword set is one of the R candidate codeword sets; wherein a q-th codeword $W_{q,s}$ in an r-th candidate codeword set satisfies $W_{q,s}=D^qW_r$; $D^q$ represents a q-th codeword in a second candidate codeword set formed by a square matrix with a dimension of P×P; $W_r$ represents a reference precoding matrix with a dimension P×υ; $x(i)=[x^{(0)}(i) \ldots x^{(v-1)}(i)]^T$.

12. The uplink transmission method according to claim 11, wherein a scheduling bandwidth of the uplink signal comprises a total of B subbands with indexes from 0 to B−1, B is an integer greater than or equal to 1;
in a case that an index of a resource element to which the x(i) is to be mapped in a subband where the resource element is located is Li, the $q_1=\text{mod}(M_2, L_1)$; or
in a case that an index of a subband where a resource element to which the x(i) is to be mapped is located is $L_2$, the $q_1=\text{mod}(M_2, L_2)$;
wherein $M_2$ is a quantity of codewords in the first candidate codeword set.

13. An uplink transmission scheduling method, applied to a base station, comprising:
determining scheduling information of an uplink signal according to a transmission scheme of a terminal for the uplink signal;
wherein the transmission scheme comprises: performing delay processing of the uplink signal on multiple antenna ports, or performing precoding processing of the uplink signal on multiple antenna ports by cyclically using codebooks in a candidate codebook set;
wherein,
the performing the delay processing of the uplink signal on the multiple antenna ports, or performing the precoding processing of the uplink signal on the multiple antenna ports by cyclically using the codebooks in the candidate codebook set comprises:

performing precoding processing of a data stream of the uplink signal by using following formula:

$$\begin{bmatrix} y^{(0)}(i) \\ M \\ y^{(P-1)}(i) \end{bmatrix} = D(i)W_0(i) \begin{bmatrix} x^{(0)}(i) \\ M \\ x^{(v-1)}(i) \end{bmatrix}$$

wherein, $x^{(u)}(i)$ represents a data symbol with an index i in a data stream with an index u of the uplink signal, v represents a quantity of data streams; D(i) represents a square matrix with a dimension of P×P that corresponds to x(i), P represents a quantity of antenna ports configured for the terminal that correspond to the uplink signal; $x(i)=[x^{(0)}(i) \ldots x^{(v-1)}(i)]^T$; $W_0(i)$ represents a reference precoding matrix with a dimension P×υ that corresponds to x(i), $x(i)=[x^{(0)}(i) \ldots x^{(v-1)}(i)]^T$; $y^{(p)}(i)$ represents a symbol mapped to an antenna port p and corresponding to x(i), p represents an index of the antenna port;

or, performing precoding processing of the data stream of the uplink signal by using following formula:

$$\begin{bmatrix} y^{(0)}(i) \\ M \\ y^{(P-1)}(i) \end{bmatrix} = W_1(i) \begin{bmatrix} x^{(0)}(i) \\ M \\ x^{(v-1)}(i) \end{bmatrix}$$

wherein, $x^{(u)}(i)$ represents the data symbol with an index i in the data stream with an index u of the uplink signal; v represents the quantity of data streams; P represents the quantity of antenna ports configured for the terminal that correspond to the uplink signal; $x(i)=[x^{(0)}(i) \ldots x^{(v-1)}(i)]^T$; $W_1(i)$ represents a predetermined precoding matrix with a dimension of P×υ in a precoding matrix group in a candidate precoding matrix set $W_1^s(i)$; $y^{(p)}(i)$ represents the symbol mapped to the antenna port p and corresponding to x(i), and p represents the index of the antenna port; the candidate precoding matrix set $W_1^s(i)$ comprises R precoding matrix groups, wherein a q-th precoding matrix $W_{q,s}$ in an r-th precoding matrix group satisfies $W_{q,s}=D^q W_r$; $D^q$ represents a q-th codeword in a first candidate codeword set formed by a square matrix with a dimension of P×P; $W_r$ represents a reference precoding matrix with a dimension of P×υ; v represents a quantity of data streams used to calculate an equivalent channel; P represents the quantity of antenna ports configured for the terminal that correspond to the uplink signal.

14. The uplink transmission scheduling method according to claim 13, wherein the determining the scheduling information of the uplink signal according to the transmission scheme of the terminal for the uplink signal comprises:

acquiring an equivalent uplink channel by using a second formula, and determining the scheduling information of the uplink signal by using the equivalent uplink channel; the second formula is:

$H(i)'=D(i)W(i)H(i)$;

wherein H(i) is an uplink channel estimation value which corresponds to a resource element with an index i and is acquired by the base station according to a reference signal for uplink channel state information (CSI) acquisition, H(i)' is an equivalent channel of an uplink channel which corresponds to the resource element with the index i and is acquired by the base station according to the reference signal for uplink CSI acquisition; D(i) is a square matrix with a dimension of P×P that corresponds to the resource element with the index i, P represents a quantity of antenna ports configured for the terminal that correspond to the uplink signal; W(i) is a reference precoding matrix used by the base station to calculate the equivalent channel corresponding to the resource element with the index i, all resource elements in a same subband correspond to a same D(i), and there is a predetermined rule between a value of D(i) and a number or frequency of the subband, or the value of D(i) is determined according to a frequency domain position of the resource element with the index i in the subband;

or, the second formula is:

$H(i)'=W_1(i)H(i)$ wherein H(i) is the uplink channel estimation value which corresponds to the resource element with the index i and is acquired by the base station according to the reference signal for uplink CSI acquisition, H(i)' is the equivalent channel of the uplink channel which corresponds to the resource element with the index i and is acquired by the base station according to the reference signal for uplink CSI acquisition; $W_1(i)$ represents a precoding matrix $W_1$ in the codeword set $W_1^s(i)$ that corresponds to the resource element i; $W_1^s(i)$ is dividable into K codeword groups, wherein a q-th codeword in a k-th codeword group satisfies $W_{q,s}=D^q W_k$; $D^q$ represents a q-th codeword in a second candidate codeword set formed by a square matrix with a dimension of P×P; $W_k$ represents a reference precoding matrix with a dimension P×υ; the base station determines $W_1$ of each resource element by cyclically using codewords in the first candidate codeword set, the first candidate codeword set is a codeword group in $W_1^s(i)$.

15. The uplink transmission scheduling method according to claim 14, further comprising:

sending an indication message for determining the D(i) or $D^q$ to the terminal.

16. The uplink transmission scheduling method according to claim 14, wherein a value of an element $d(i)_{l,m}$ in an l-th row and an m-th column of the D(i) or $D^q$ is determined in the following manner:

$$d(i)_{l,m} = \begin{cases} 0, & l \neq m \\ e^{-j(l-1)\theta_1 n_1/P}, & l = m \end{cases};$$

or, in a case that the terminal has a non-coherent transmission capability, $$d(i)_{l,m} = \begin{cases} 0, & l \neq m \\ e^{-j(l-1)\theta_2 n_1/P}, & l = m \end{cases};$$

in a case that the terminal has a full-coherent transmission capability, $$d(i)_{l,m} = \begin{cases} 0, & l \neq m \\ 1, & l = m \end{cases};$$

in a case that the terminal has a partial-coherent transmission capability, $$d(i)_{l,m} = \begin{cases} 0, & l \neq m \\ e^{-ja_z\theta_3 n_1/P}, & l = m \end{cases};$$

wherein $a_z$ is a coefficient corresponding to a z-th coherent transmission antenna group; each of the $\theta_1$, $\theta_2$ and $\theta_3$ is a predetermined angle value; $n_1$ is an integer greater than 0.

17. The uplink transmission scheduling method according to claim 13, further comprising:
sending to the terminal indication information for indicating that predetermined processing of the uplink signal is to be performed on multiple antenna ports, wherein the predetermined processing comprises: performing delay processing of the uplink signal on multiple antenna ports during a precoding process, or performing precoding processing of the uplink signal on multiple antenna ports by cyclically using codebooks in a candidate codebook set.

18. A terminal, comprising: a memory, a processor, and a computer program stored in the memory and executable by the processor;
the processor is configured to read the computer program in the memory to implement the steps of the uplink transmission method according to claim 1.

19. A terminal, comprising: a memory, a processor, and a computer program stored in the memory and executable by the processor; wherein
the processor is configured to read the computer program in the memory to implement the steps of the uplink transmission method according to claim 11.

20. A base station, comprising: a memory, a processor, and a computer program stored in the memory and executable by the processor; wherein
the processor is configured to read the computer program in the memory to implement the steps of the uplink transmission scheduling method according to claim 13.

* * * * *